(12) United States Patent
Wang et al.

(10) Patent No.: US 10,680,244 B2
(45) Date of Patent: Jun. 9, 2020

(54) GRAPHITE COMPOSITE STRUCTURE, METHOD OF FABRICATING THE SAME AND COMPOSITE ELECTRODE STRUCTURE OF THE SAME

(71) Applicant: Industrial Technology Research Institute, Hsinchu (TW)

(72) Inventors: Ding-Shiang Wang, Tainan (TW); Ming-Sheng Leu, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 183 days.

(21) Appl. No.: 15/379,444

(22) Filed: Dec. 14, 2016

(65) Prior Publication Data

US 2018/0069240 A1 Mar. 8, 2018

(30) Foreign Application Priority Data

Sep. 6, 2016 (TW) .............................. 105128749 A

(51) Int. Cl.
*H01M 4/587* (2010.01)
*H01M 4/133* (2010.01)
(Continued)

(52) U.S. Cl.
CPC ........... *H01M 4/587* (2013.01); *C01B 32/205* (2017.08); *H01M 4/043* (2013.01);
(Continued)

(58) Field of Classification Search
CPC .... H01M 4/587; H01M 4/625; H01M 4/1393; H01M 4/0471; H01M 4/043; H01M 10/0525; H01M 4/133; C01B 32/205
(Continued)

(56) References Cited

U.S. PATENT DOCUMENTS 4,201,611 A 5/1980 Stover
4,217,336 A 8/1980 Maire et al.
(Continued)

FOREIGN PATENT DOCUMENTS

| CN | 105226251 | 1/2016 |
|---|---|---|
| CN | 105762329 | 7/2016 |
| TW | I455879 | 10/2014 |

OTHER PUBLICATIONS

"Office Action of Taiwan Counterpart Application," dated Oct. 16, 2017, p. 1-p. 4, in which the listed references were cited.

(Continued)

*Primary Examiner* — Gary D Harris
(74) *Attorney, Agent, or Firm* — JCIPRNET

(57) ABSTRACT

A method of fabricating a graphite composite structure includes the following steps. An amorphous carbon layer having a short-range ordered structure region in a range from 50% to 100% is provided. At least one force is locally applied on a surface of the amorphous carbon layer to form at least one stressed region. An annealing process is performed on the amorphous carbon layer so as to form at least one long-range ordered graphite structure in the at least one stressed region. The at least one long-range ordered graphite structure includes a stack structure including a plurality of (002) planes. An angle between an extension direction of the (002) planes and the surface of the amorphous carbon layer is in a range from 45 degrees or more to 90 degrees or less.

20 Claims, 21 Drawing Sheets

(51) Int. Cl.
  *H01M 10/0525* (2010.01)
  *H01M 4/04* (2006.01)
  *H01M 4/1393* (2010.01)
  *H01M 4/62* (2006.01)
  *C01B 32/205* (2017.01)

(52) U.S. Cl.
  CPC ......... *H01M 4/0471* (2013.01); *H01M 4/133* (2013.01); *H01M 4/1393* (2013.01); *H01M 4/625* (2013.01); *H01M 10/0525* (2013.01)

(58) Field of Classification Search
  USPC ...................................................... 429/231.8
  See application file for complete search history.

(56) References Cited

U.S. PATENT DOCUMENTS

| | | |
|---|---|---|
| 4,417,175 A | 11/1983 | Curren et al. |
| 4,504,454 A | 3/1985 | Riggs |
| 4,607,193 A | 8/1986 | Curren et al. |
| 5,951,959 A | 9/1999 | Nishimura |
| 6,485,858 B1 | 11/2002 | Baker et al. |
| 2004/0040252 A1 | 3/2004 | Beral et al. |
| 2006/0063005 A1* | 3/2006 | Gardner ................. B82Y 30/00 428/408 |
| 2006/0102455 A1 | 5/2006 | Chiang et al. |
| 2007/0199348 A1 | 8/2007 | Gudgel et al. |
| 2014/0178753 A1 | 6/2014 | Chu et al. |
| 2014/0227588 A1 | 8/2014 | Kim et al. |

OTHER PUBLICATIONS

Wang et al., "Stress-patterned Self-formation of Textured Graphite Conducting Wires in Amorphous Carbon Matrix," Carbon, Jul. 13, 2016, pp. 1-29.

McCulloch et al., "Molecular dynamics and experimental studies of preferred orientation induced by compressive stress", Nuclear instruments & methods in physics research. Section B, Beam interactions with materials and atoms, Jan. 1, 1995, pp. 545-549.

Matsui et al., "Stress graphitization of C/C composite reinforced by carbon nanofiber", Letters to the Editor / Carbon 43, Mar. 2, 2005, pp. 1557-1583.

Lanticse-Diaz et al., "The effect of nanotube alignment on stress graphitization of carbon/carbon nanotube composites", Carbon 47, Dec. 7, 2008, pp. 974-980.

Shakerzadeh et al., "Re-ordering Chaotic Carbon: Origins and Application of Textured Carbon", Adv. Mater., May 18, 2012, pp. 4112-4123.

Mukhopadhyay et al., "Engineering of Graphene Layer Orientation to Attain High Rate Capability and Anisotropic Properties in Li-Ion Battery Electrodes", Adv. Funct. Mater., Jan. 6, 2013, pp. 2397-2404.

Xu et al., "Effect of initial sp3 content on bonding structure evolution of amorphous carbon upon pulsed laser annealing", Diamond & Related Materials, Oct. 13, 2012, pp. 48-52.

Shakerzadeh et al., "Field emission enhancement and microstructural changes of carbon films by single pulse laser irradiation", Carbon 49, Nov. 12, 2010, pp. 1018-1024.

Teo et al., "Nano-patterning of through-film conductivity in anisotropic amorphous carbon induced using conductive atomic force microscopy", Carbon 49, Feb. 24, 2011, pp. 2679-2682.

McKenzie et al., "Thermodynamic theory for preferred orientation in materials prepared by energetic condensation", Thin Solid Films, Feb. 14, 2001, pp. 280-287.

Tan et al., "Microstructure and through-film electrical characteristics of vertically aligned amorphous carbon films", Diam. Relat. Mat., Jan. 12, 2011, pp. 290-293.

Lau et al., "Abrupt Stress Induced Transformation in Amorphous Carbon Films with a Highly Conductive Transition Phase", Phy. Rev. Lett, Apr. 28, 2008, pp. 176101-1-4.

* cited by examiner

GRAPHITE COMPOSITE STRUCTURE, METHOD OF FABRICATING THE SAME AND COMPOSITE ELECTRODE STRUCTURE OF THE SAME

CROSS-REFERENCE TO RELATED APPLICATION

This application claims the priority benefit of Taiwan application serial no. 105128749, filed on Sep. 6, 2016. The entirety of the above-mentioned patent application is hereby incorporated by reference herein and made a part of this specification.

TECHNICAL FIELD

The technical field relates to a graphite composite structure, a method of fabricating the same, and a composite electrode structure of the same.

BACKGROUND

With miniaturization and multi-functionalization of next generation electronic products, more novel materials are required for current electronic products to enhance conductive effects of the whole components. Among numerous candidate materials, carbonaceous materials are now commonly considered to have a good chance to become one of next generation semiconductor materials by replacing traditional silicon materials.

Among the carbonaceous materials, textured graphite has good directional transmission capability, large current capacity and extremely high conductivity, and may be applied to interconnection of high directivity conductive electronic devices and electrode materials of high power lithium-ion batteries.

However, it is neither possible to mass produce textured graphite materials nor to effectively prepare a textured graphite structure having high conductivity in vertical direction. In addition, since a single structure generally has one single excellent characteristic, when a component requires two characteristics at the same time, the material thereof is more costly and complicated to produce.

SUMMARY

Embodiments of the disclosure introduce a method of fabricating a graphite composite structure, the method including the following steps. An amorphous carbon layer is provided, wherein a short-range ordered structure region accounts for 50% to 100% of the amorphous carbon layer. At least one force is locally applied on a surface of the amorphous carbon layer to form at least one stressed region. An annealing process is performed on the amorphous carbon layer so as to form at least one long-range ordered graphite structure in the at least one stressed region. The at least one long-range ordered graphite structure includes a stack structure including a plurality of (002) planes. An angle between an extension direction of the (002) planes and the surface of the amorphous carbon layer is in a range from 45 degrees or more to 90 degrees or less.

Embodiments of the disclosure introduce a graphite composite structure including an amorphous carbon layer and at least one long-range ordered graphite structure. The at least one long-range ordered graphite structure is located in the amorphous carbon layer, wherein the at least one long-range ordered graphite structure includes a stack structure including a plurality of planes, an angle between an extension direction of the planes and a surface of the amorphous carbon layer is in a range from 45 degrees or more to 90 degrees or less, and resistivity of the at least one long-range ordered graphite structure is in a range from $1\times10^{-5}$ to $1\times10^{-4}$ $\Omega\cdot$cm.

In one embodiment of the disclosure, a composite electrode structure is introduced including an electrode current collector and a graphite composite structure. The graphite composite structure is located on the electrode current collector. The graphite composite structure includes an amorphous carbon layer and at least one long-range ordered graphite structure. The amorphous carbon layer is located on the electrode current collector. The at least one long-range ordered graphite structure is located in the amorphous carbon layer, wherein the at least one long-range ordered graphite structure includes a stack structure including a plurality of planes, an angle between an extension direction of the planes and a surface of the amorphous carbon layer is in a range from 45 degrees or more to 90 degrees or less, and resistivity of the at least one long-range ordered graphite structure is in a range from $1\times10^{-5}$ to $1\times10^{-4}$ $\Omega\cdot$cm.

Several exemplary embodiments accompanied with figures are described in detail below to further describe the disclosure in details.

DETAILED DESCRIPTION OF DISCLOSED EMBODIMENTS

Figure 1:
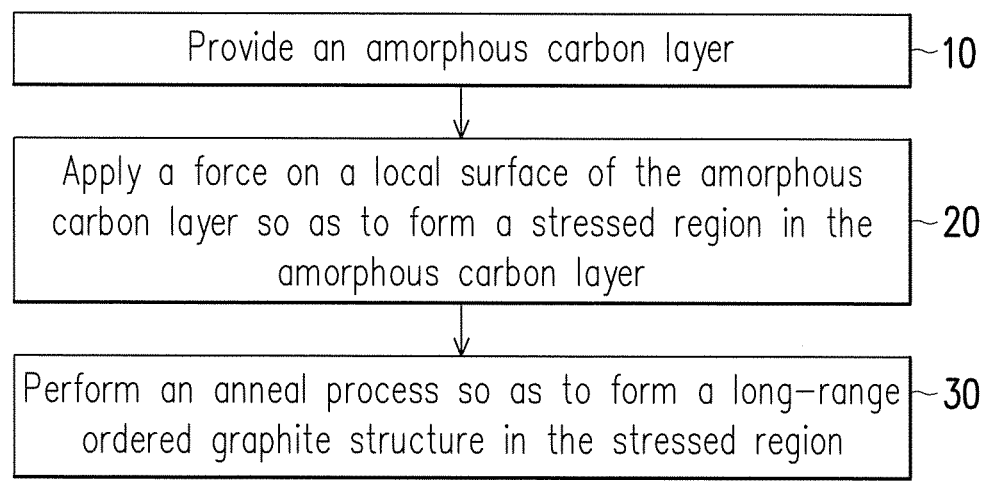
FIG. 1 is a flow chart of a method of fabricating a graphite composite structure according to an embodiment of the disclosure.
Figure 2A:
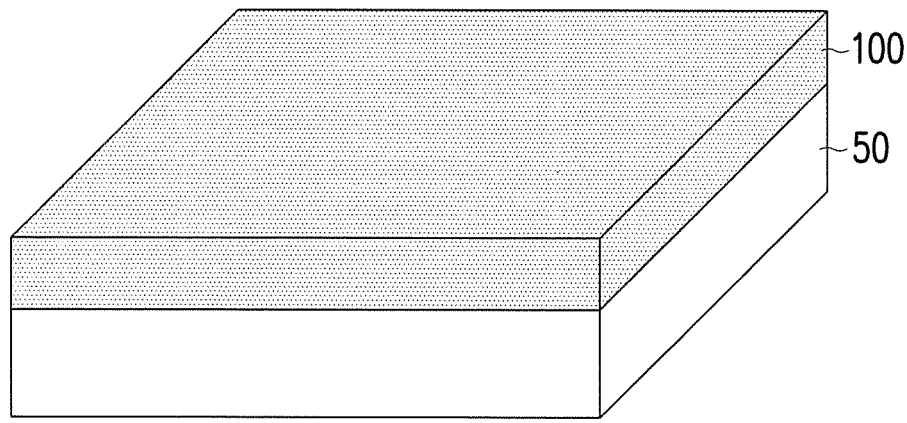
FIG. 2A to FIG. 2C are schematic diagrams of the method of fabricating a graphite composite structure according to an embodiment of the disclosure.
Figure 2B:
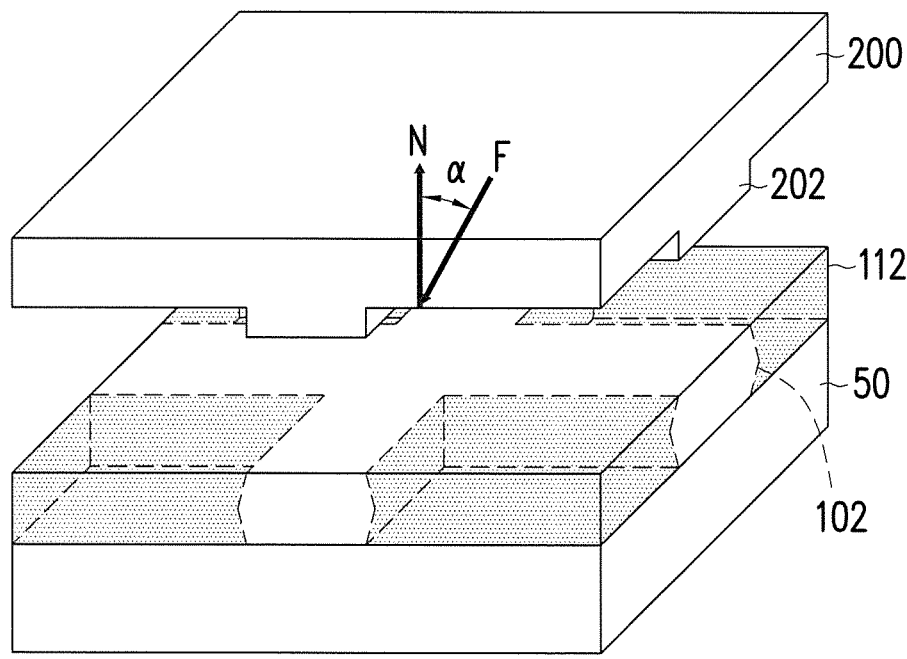
Figure 2C:
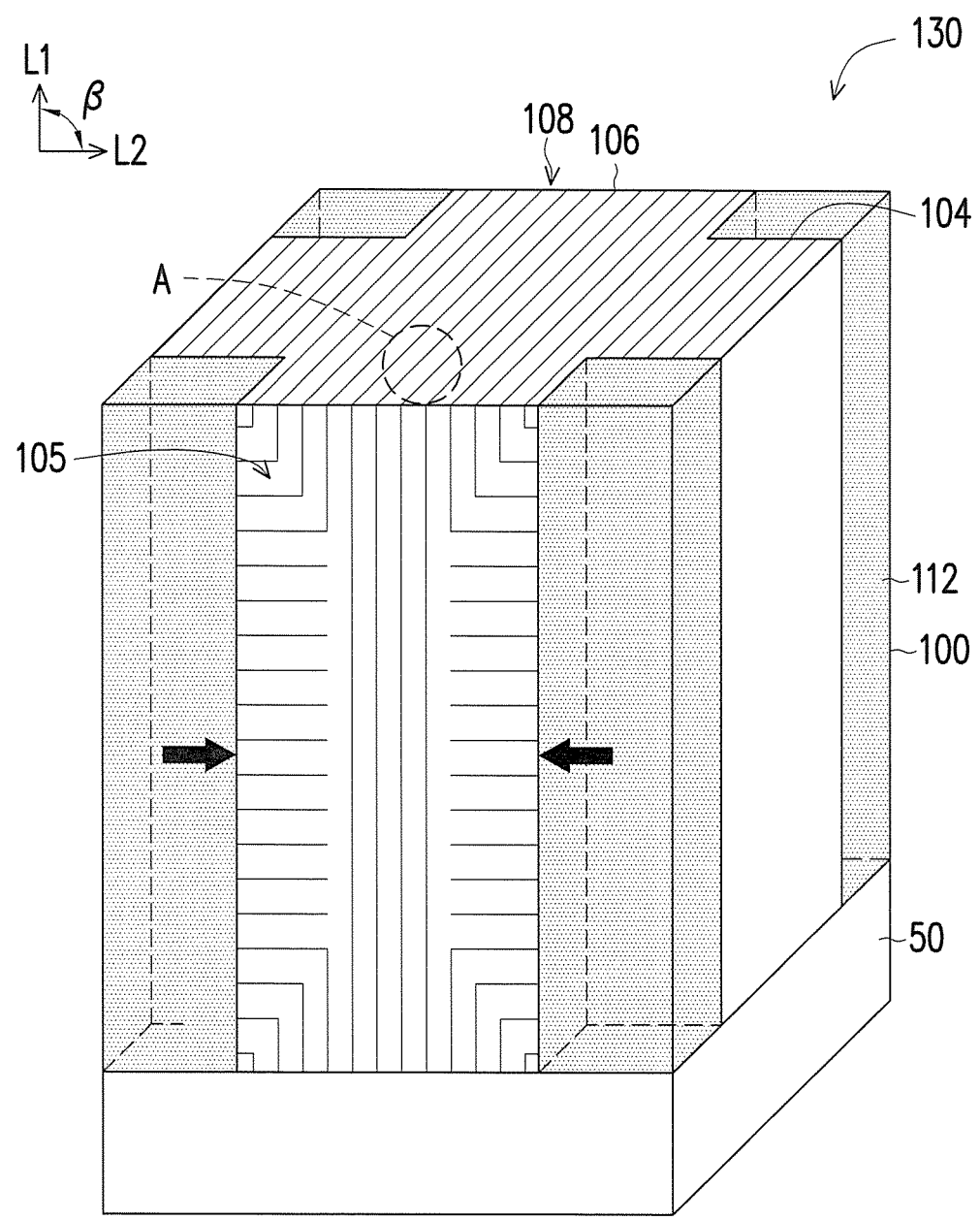

FIG. 1 is a flow chart of a method of fabricating a graphite composite structure according to an embodiment of the disclosure. FIG. 2A to FIG. 2C are schematic diagrams of the method of fabricating a graphite composite structure according to an embodiment of the disclosure. For clear illustration, FIG. 2B and FIG. 2C are illustrated on different scales.

Referring to FIG. 1 and FIG. 2A, in step 10 of the method of fabricating a textured graphite structure according to an embodiment of the disclosure, an amorphous carbon layer (a-C) 100 is provided. In some embodiments, an $SP^3$ structure region accounts for 40% or less of the amorphous carbon layer 100. In other embodiments, the $SP^3$ structure region accounts for 5% to 15% of the amorphous carbon layer 100. In some embodiments, a short-range ordered structure region accounts for 50% or more of the amorphous carbon layer 100. In some exemplary embodiments, the short-range ordered structure region accounts for 50% to 100% of the amorphous carbon layer 100. In other exemplary embodiments, the short-range ordered structure region accounts for 90% to 100% of the amorphous carbon layer 100.

The amorphous carbon layer 100 is formed on a substrate 50. A material of the substrate 50 may be other composite materials, metals or semiconductors, such as aluminum alloys, stainless steel, silicon wafer, copper foil, or a combination thereof. A method of forming the amorphous carbon layer 100 is, for example, physical vapor deposition (PVD), chemical vapor deposition (CVD), or a combination thereof. PVD is performed by, for example, sputtering or arc ion plating. In some exemplary embodiments, the deposition is performed by PVD, and a graphite target material having purity of 99.9% is subjected to deposition. In some embodiments, the amorphous carbon layer 100 has a thickness of, for example, 10 nm to 2000 nm.

Referring to FIG. 1 and FIG. 2B, in step 20, at least one force F is locally applied to at least one region of the amorphous carbon layer 100. A magnitude of the force F is relevant to the thickness of the amorphous carbon layer 100. In some embodiments, the thickness of the amorphous carbon layer 100 is, for example, 10 nm to 2000 nm, and the magnitude of the force F is at least equal to or greater than 3 GPa. If less than 3 GPa, stress-induced graphitization and orientation are not noticeable. In some exemplary embodiments, the magnitude of the at least one force F ranges from 3 to 10 GPa. In other exemplary embodiments, the magnitude of the at least one force F ranges from 4 to 6 GPa. An angle between a direction in which the at least one force F acts and a normal direction N of a surface of the amorphous carbon layer 100 is α. In some embodiments, the angle α ranges as: $0° \leq α \leq 45°$. The at least one force F may have various patterns, such as circular, triangular, rectangular, rhomboid, cross-shaped, T-shaped, L-shaped, comb-shaped, or a combination thereof. The applied force F forms a stressed region 102, and even causes deformation or broken bonds in an internal atomic structure of the amorphous carbon layer 100. In a subsequent annealing process, when the energy is provided, recombination is more likely to occur in the stressed region 102 to form a textured graphite structure.

In some exemplary embodiments, a method of applying at least one force F on a local surface of the amorphous carbon layer 100 includes disposing a template 200 on the amorphous carbon layer 100, and applying the at least one force F on the template 200, so as to form the at least one stressed region 102. A material of the template 200 is, for example, SiC, TiC or the like, or other materials having high hardness and high-temperature resistance. In addition, by the design of the template 200, stress in different directions can be generated, so that the direction of the graphite structure can be controlled by stress induction. For example, the template 200 includes a convex portion 202. The convex portion 202 may have various patterns, such as circular, triangular, rectangular, rhomboid, cross-shaped, T-shaped, L-shaped, comb-shaped, or a combination thereof. Accordingly, the at least one force F locally applied to the amorphous carbon layer 100 has various patterns of force. In other embodiments, at least one force is locally applied to at least one region of the amorphous carbon layer 100 by a continuous stress generation roller.

Referring to FIG. 1 and FIG. 2C, in step 30, an annealing process is performed on the amorphous carbon layer 100. The annealing process recombines and arranges the atomic structure by utilizing high temperature energy. Various methods may be adopted in the annealing process. In some embodiments, after force is applied by the template 200, the template 200 is removed and the annealing process is then performed. When the annealing process is performed after the prior force application step, the textured graphite structure is perpendicular to a surface of the substrate 50. In other embodiments, the annealing process is performed at the same time as the force is applied by the template 200. When the force application and the annealing process are simultaneously performed, a textured graphite structure having two directions is generated due to stress in two directions.

Since the embodiments of the disclosure induce graphitization by stress, the annealing process may be performed at relatively low annealing temperatures. The temperature of the annealing process may be lower than 1000° C. In some embodiments, the temperature of the annealing process ranges from 400 to 900° C. In other embodiments, the temperature of the annealing process ranges from 400 to 700° C. In some embodiments, the annealing process is performed for 5 to 120 minutes. In some embodiments, the annealing process is performed for 30 to 60 minutes. The annealing process is performed by, for example, rapid thermal annealing (RTA). The temperature rise rate for the annealing process is, for example, 50 to 300° C./min.

After the thermal annealing process, in the amorphous carbon layer 100, a long-range ordered graphite structure 104 is formed in the at least one stressed region 102. In the region other than the stressed region 102, the amorphous carbon structure is maintained as no residual stress acts, and the region is called an amorphous carbon region 112. The long-range ordered graphite structure 104 has more excellent conductivity than the amorphous carbon region 112. In some embodiments, the long-range ordered graphite structure 104 has resistivity of $1 \times 10^{-5}$ to $1 \times 10^{-4}$ Ω·cm, and the amorphous carbon region 112 has resistivity of $1 \times 10^{-2}$ to $1 \times 10^{-3}$ Ω·cm.

Figure 3:
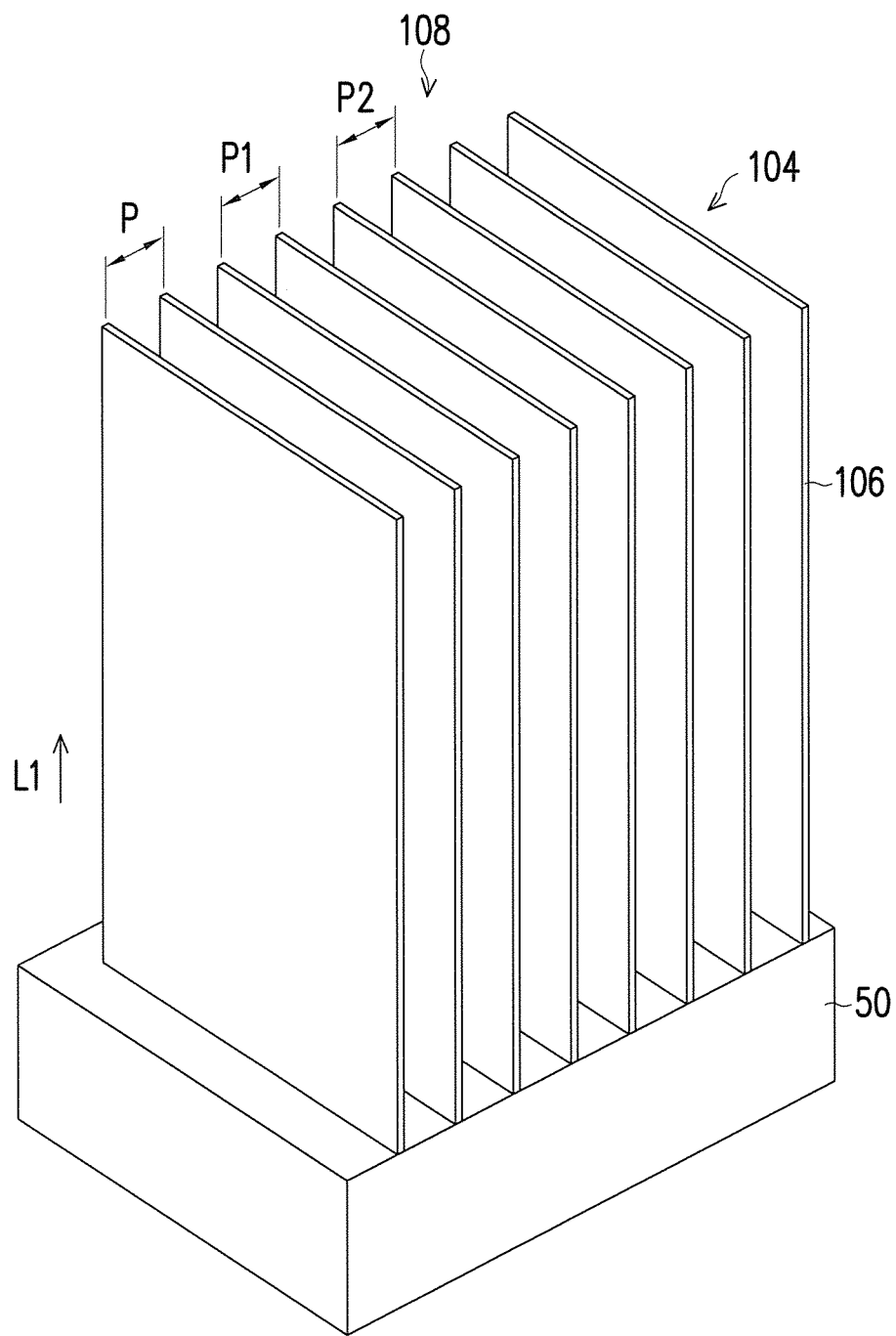
FIG. 3 is an enlarged schematic diagram of a long-range ordered graphite structure.

FIG. 3 is an enlarged schematic diagram of the long-range ordered graphite structure in region A in FIG. 2C. Referring to FIG. 2C and FIG. 3, a composite structure 130 includes the long-range ordered graphite structure 104 and the amorphous carbon layer 100/the amorphous carbon region 112. In an embodiment, the long-range ordered graphite structure 104 is located in the amorphous carbon layer 100. In other words, the amorphous carbon region 112 is around the long-range ordered graphite structure 104.

The long-range ordered graphite structure 104 includes a stack structure 108 including a plurality of planes 106. In some embodiments, the planes 106 are (002) planes, and an angle β between an extension direction L1 of the planes 106 and a surface L2 of the amorphous carbon layer 100/the amorphous carbon region 112 ranges as: $45° \leq β \leq 90°$. In an exemplary embodiment, the extension direction L1 of the planes 106 is perpendicular to the surface L2 of the amorphous carbon layer 100/the amorphous carbon region 112, i.e., the angle β is 90°. In the stack structure 108, the planes 106 are arranged nearly parallel to each other. More specifically, in some embodiments, a spacing P between the planes 106 ranges from 0.30 to 0.39 nm. In other embodiments, the spacing P between the planes 106 ranges from 0.331 to 0.341 nm. In other words, in some embodiments, a pitch difference ΔP (P1−P2) of the pitch of two adjacent planes 106 ranges less than 0.09 nm. In other embodiments, the pitch difference ΔP ranges from 0.01 to 0.02 nm.

In addition, referring to FIG. 2C, in some embodiments, after the annealing process, the amorphous carbon layer 100 around the stressed region 102 is partially graphitized to form a long-range ordered graphite structure, which is herein called a transition region 105. The transition region 105 may also include horizontally oriented graphite. Moreover, the amorphous carbon layer 100 other than that around the stressed region 102 is also partially graphitized to form horizontally oriented graphite. However, this horizontally oriented graphite contains more defects, and has random orientation and higher resistivity.

Figure 4A:
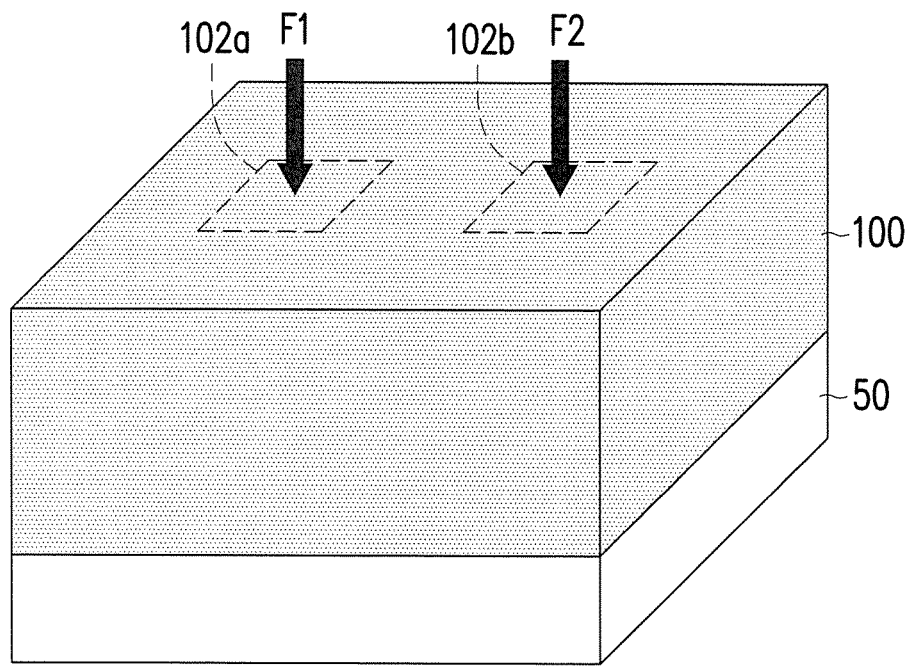
FIG. 4A is a schematic diagram in which a plurality of forces are locally applied to a plurality of regions of an amorphous carbon layer.

FIG. 4A is a schematic diagram in which a plurality of forces are locally applied to a plurality of regions of an amorphous carbon layer. The above embodiments have described the case where the force F is locally applied to a single stressed region 102 of the amorphous carbon layer 100. However, embodiments of the disclosure are not limited thereto. In other embodiments, referring to FIG. 4A, a plurality of forces F1 and F2 may be locally applied to different positions on the surface of the amorphous carbon layer 100 to form a plurality of stressed regions 102a and 102b, so as to form long-range ordered graphite structures after the annealing process. The forces F1 and F2 may be the same as or different from each other in magnitude, pattern, direction in which they act, etc. The long-range ordered graphite structures which they form are not connected with each other, and may be accordingly the same as or different from each other n depth, pattern, and extension direction of the planes.

Figure 4B:
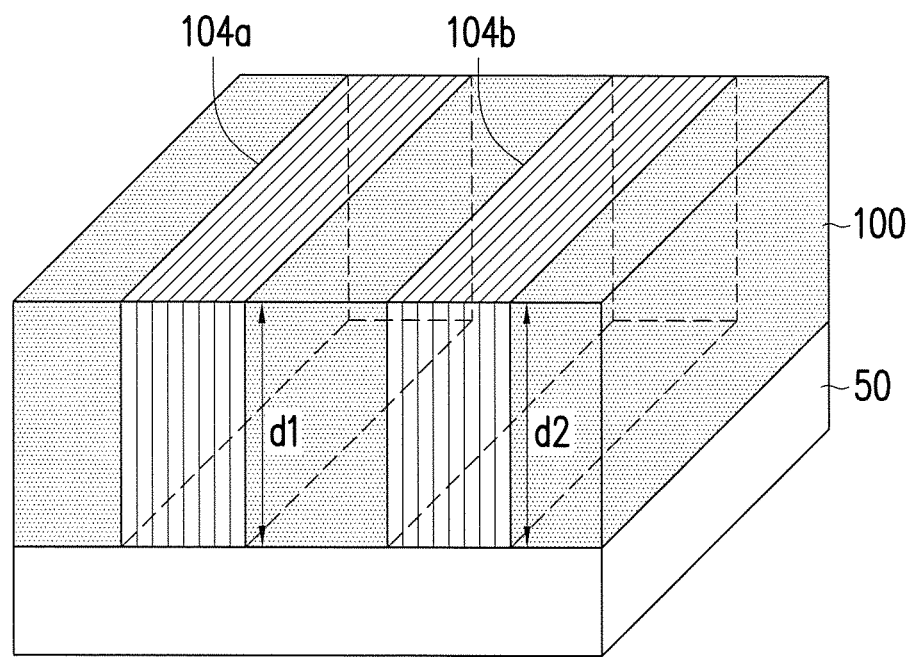
FIG. 4B is a schematic diagram of a graphite composite structure formed by an annealing process performed after a plurality of forces of the same magnitude are locally applied to a plurality of regions of an amorphous carbon layer.
Figure 4C:
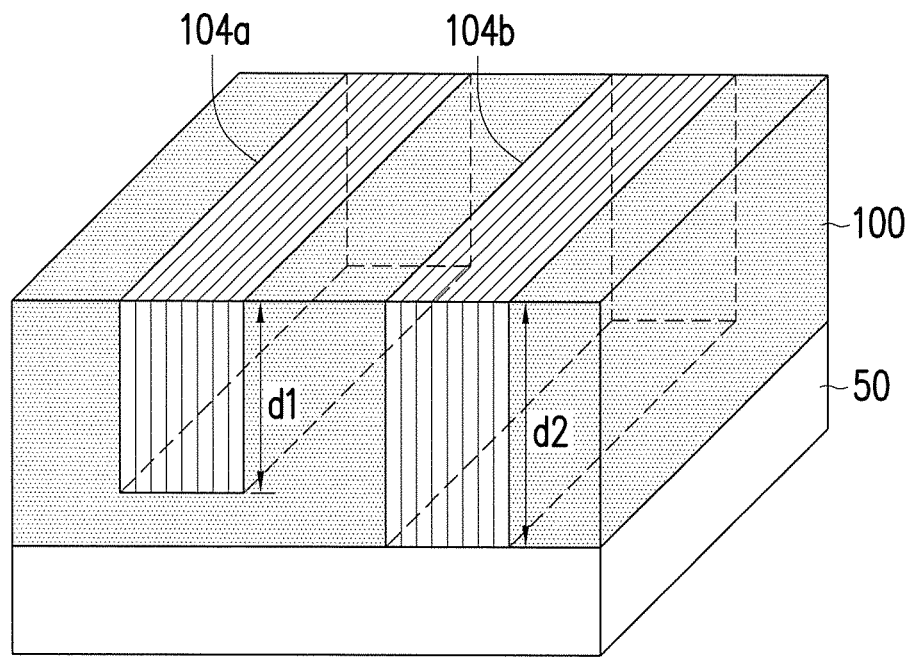
FIG. 4C is a schematic diagram of a graphite composite structure formed by an annealing process performed after a plurality of forces of different magnitudes are locally applied to a plurality of regions of an amorphous carbon layer.

FIG. 4B is a schematic diagram of a graphite composite structure formed by an annealing process performed after a plurality of forces of the same magnitude are locally applied to a plurality of regions of an amorphous carbon layer. FIG. 4C is a schematic diagram of a graphite composite structure formed by an annealing process performed after a plurality of forces of different magnitudes are locally applied to a plurality of regions of an amorphous carbon layer.

Referring to FIG. 4B, in some embodiments, when the forces F1 and F2 have the same magnitude, the long-range ordered graphite structures 104a and 104b having substantially the same depths (d1≅d2) are formed in the amorphous carbon layer 100. Referring to FIG. 4C, when the forces F1 and F2 have different magnitudes, the long-range ordered graphite structures 104a and 104b having different depths (d1≠d2) are formed in the amorphous carbon layer 100.

Figure 4D:
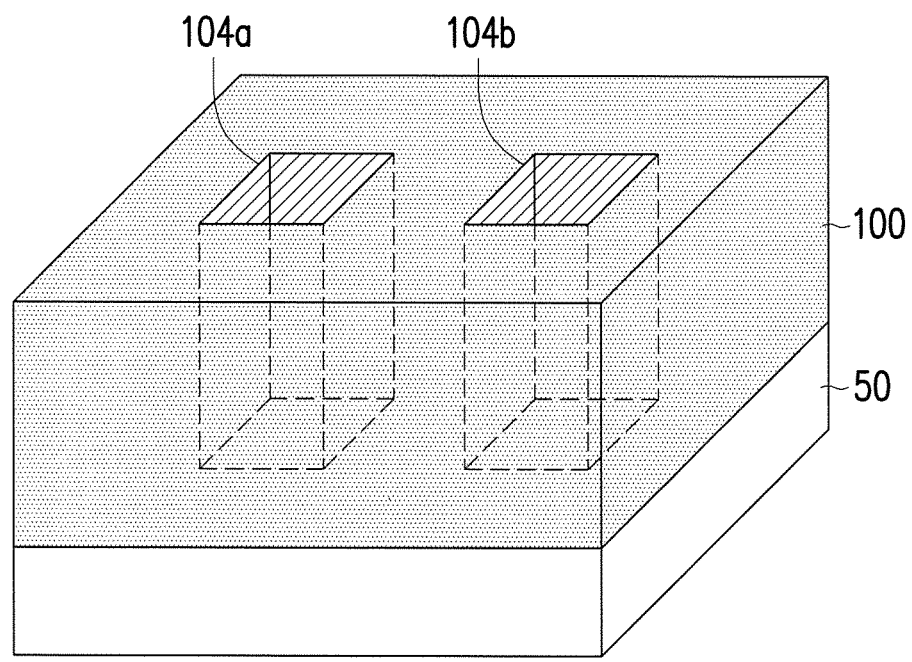
FIG. 4D is a schematic diagram of a graphite composite structure formed by an annealing process performed after a plurality of forces having the same pattern are locally applied to a plurality of regions of an amorphous carbon layer.
Figure 4E:
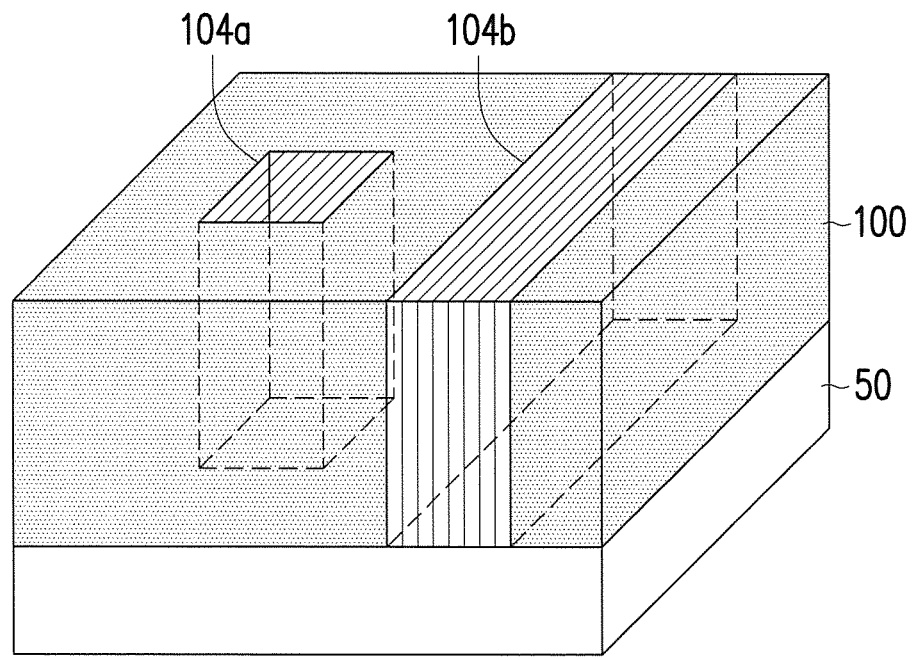
FIG. 4E is a schematic diagram of a graphite composite structure formed by an annealing process performed after a plurality of forces having different patterns are locally applied to a plurality of regions of an amorphous carbon layer.

FIG. 4D is a schematic diagram of a graphite composite structure formed by an annealing process performed after a plurality of forces having the same pattern are locally applied to a plurality of regions of an amorphous carbon layer. FIG. 4E is a schematic diagram of a graphite composite structure formed by an annealing process performed after a plurality of forces having different patterns are locally applied to a plurality of regions of an amorphous carbon layer.

Referring to FIG. 4D, in some embodiments, when the forces F1 and F2 have the same pattern and magnitude, the long-range ordered graphite structures 104a and 104b having the same pattern and the same volume are formed in the amorphous carbon layer 100. Referring to FIG. 4E, when the forces F1 and F2 have different patterns or magnitudes, the long-range ordered graphite structures 104a and 104b having different patterns or different volumes are forming in the amorphous carbon layer 100.

Figure 4F:
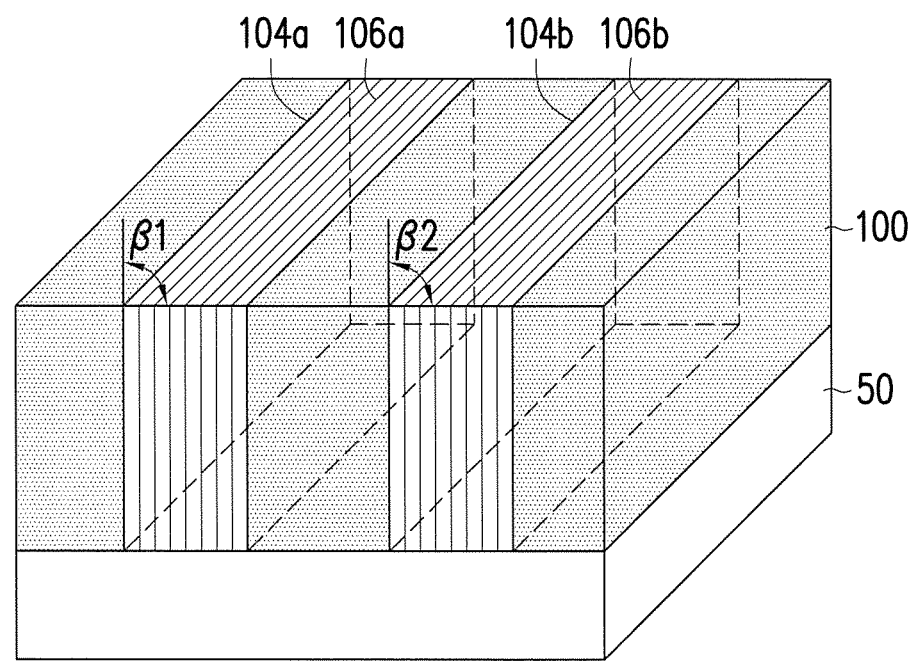
FIG. 4F is a schematic diagram of a graphite composite structure formed by an annealing process performed after a plurality of forces acting in the same direction are locally applied to a plurality of regions of an amorphous carbon layer.
Figure 4G:
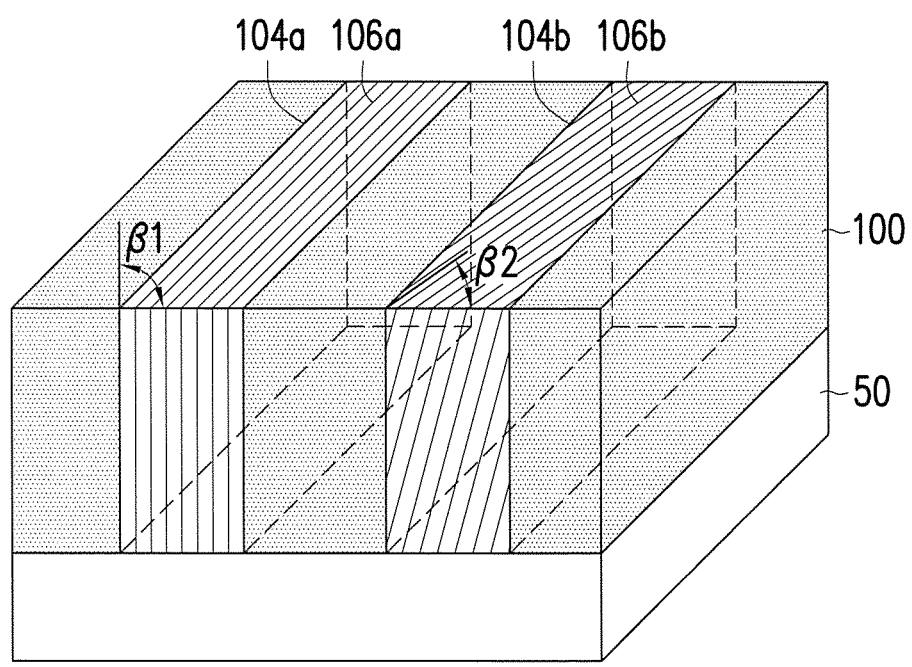
FIG. 4G is a schematic diagram of a graphite composite structure formed by an annealing process performed after a plurality of forces acting in different directions are locally applied to a plurality of regions of an amorphous carbon layer.

FIG. 4F is a schematic diagram of a graphite composite structure formed by an annealing process performed after a plurality of forces acting in the same direction are locally applied to a plurality of regions of an amorphous carbon layer. FIG. 4G is a schematic diagram of a graphite composite structure formed by an annealing process performed after a plurality of forces acting in different directions are locally applied to a plurality of regions of an amorphous carbon layer.

Referring to FIG. 4F, in some embodiments, when the forces F1 and F2 act in the same direction, the long-range ordered graphite structures 104a and 104b are formed in the amorphous carbon layer 100. The long-range ordered graphite structure 104a includes a plurality of planes 106a, and the long-range ordered graphite structure 104b includes a plurality of planes 106b. An angle 131 between an extension direction of the planes 106a and the surface of the amorphous carbon layer 100 is equal to an angle β2 between an extension direction of the planes 106b and the surface of the amorphous carbon layer 100. Referring to FIG. 4G, in other embodiments, when the forces F1 and F2 act in different directions, the angle β1 between the extension direction of the planes 106a and the surface of the amorphous carbon layer 100 differs from the angle β2 between the extension direction of the planes 106b and the surface of the amorphous carbon layer 100.

Referring to FIG. 2B, and FIG. 4B to FIG. 4F, in some embodiments, by designing the pattern shape, area size, height and angle of the convex portion 202 of the template 200, the magnitude, pattern and acting direction of the stress generated by the forces F1 and F2 can be adjusted and controlled, so that the thus formed long-range ordered graphite structures 104a and 104b can be changed in depth, pattern and extension direction of the planes 106a and 106b. However, embodiments of the disclosure are not limited thereto. Persons skilled in the art may adjust and control the magnitude, pattern and acting direction of the stress generated by the forces F1 and F2 by any known methods.

In addition, the forces F1 and F2 may be simultaneously or sequentially applied. For example, applying force by a template is equivalent to applying the forces F1 and F2 simultaneously, while applying force by a continuous stress generation roller is equivalent to applying the forces F1 and F2 sequentially.

In other words, by incorporating the use of the patterning template 200, desired long-range ordered graphite structures may be generated at the same time in a local region of the amorphous carbon layer 100. Moreover, large area of the amorphous carbon layer 100 can be patterned, and the direction in which the long-range ordered graphite structure 104 is generated can be adjusted and controlled by design of different templates.

EXPERIMENTAL EXAMPLES

Figure 5:
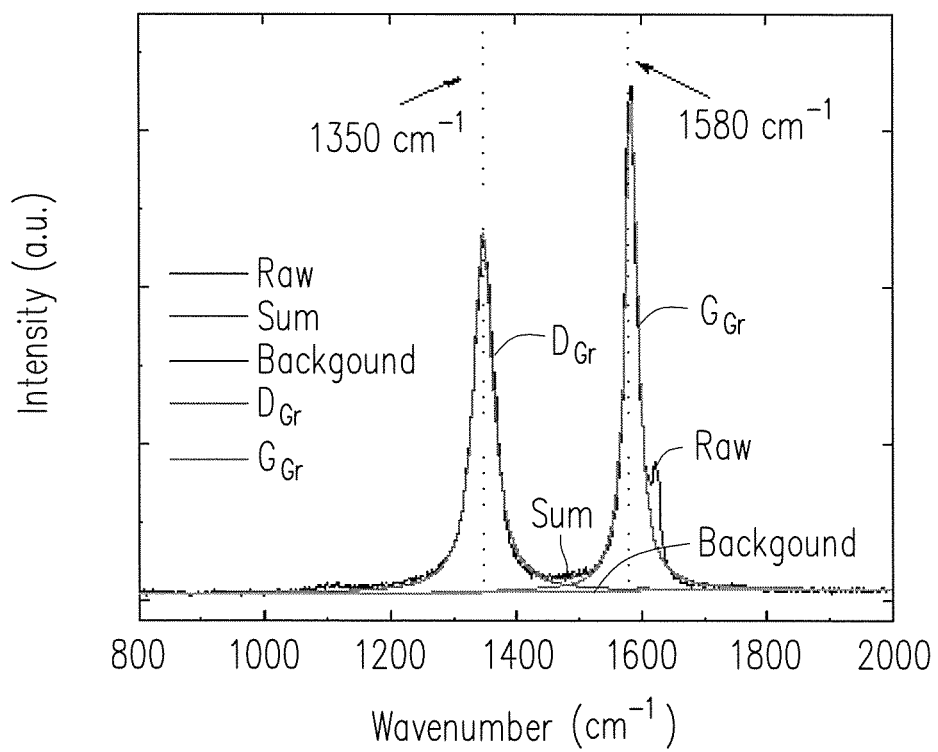
FIG. 5 is a Raman spectrum of graphite.

FIG. 5 is a Raman spectrum of graphite. FIG. 5 shows that graphite has a D peak ($D_{Gr}$) at 1350 $cm^{-1}$ and has a G peak ($G_{Gr}$) at 1580 $cm^{-1}$.

Example 1

An amorphous carbon layer having a thickness of 1000 nm was deposited on a copper foil substrate by arc ion plating. The short-range ordered structure region accounts for 55% to 65% of the amorphous carbon layer. Then, stress was applied to a surface of the amorphous carbon layer by a stress generation apparatus such as a scraper, a scratch module and a stress module, etc., so as to prepare a line having a length of 2000 μm. The stress module had a load of 320 mN and moved at a speed of 50 μm/s. In other words, a magnitude of the stress (scratch stress) provided by the stress module was around 4 to 6 GPa. Then, a test specimen was placed in an atmosphere annealing furnace, heated at a rate of 200° C./min, annealed at 600° C. and held at that temperature for 30 minutes. Upon completion, the Raman spectrum of an area where stress was generated was measured, and the result was as shown by curve 400-S&A600 in FIG. 6A and as shown in FIG. 6B.

Examples 2 and 3

In Examples 2 and 3, steps similar to those in Example 1 were repeated except that the temperature of the annealing process was changed to 500° C. and 400° C., respectively. Upon completion, the Raman spectra were measured, and the results were as shown by curves 400-S&A500 and 400-S&A400, respectively, in FIG. 6A.

Comparative Examples 1 to 3

In Comparative Examples 1 to 3, steps similar to those in Examples 1 to 3 respectively were repeated except that an area not scraped by the scraper, i.e., an unstressed region, was measured. The Raman spectra were as shown by curves 400-A600, 400-A500 and 400-A400 in FIG. 6A.

Figure 6A:
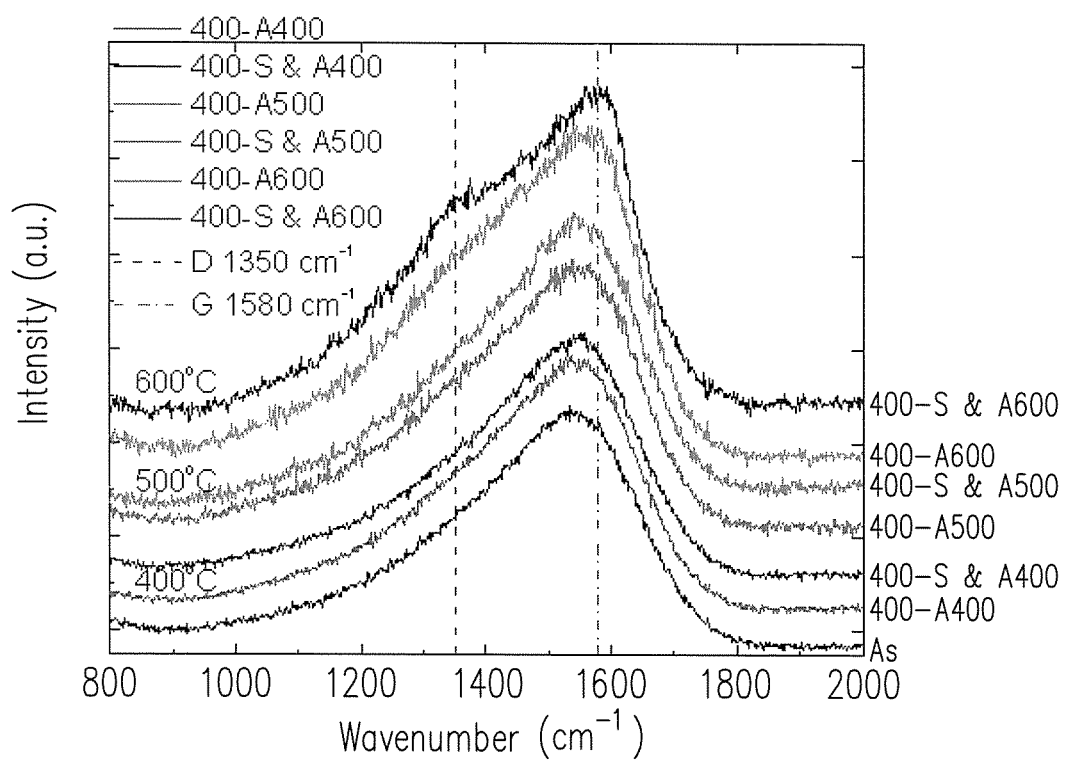
FIG. 6A is Raman spectra of Examples 1 to 3, Comparative Examples 1 to 3 and Comparative Example 7.
Figure 6B:
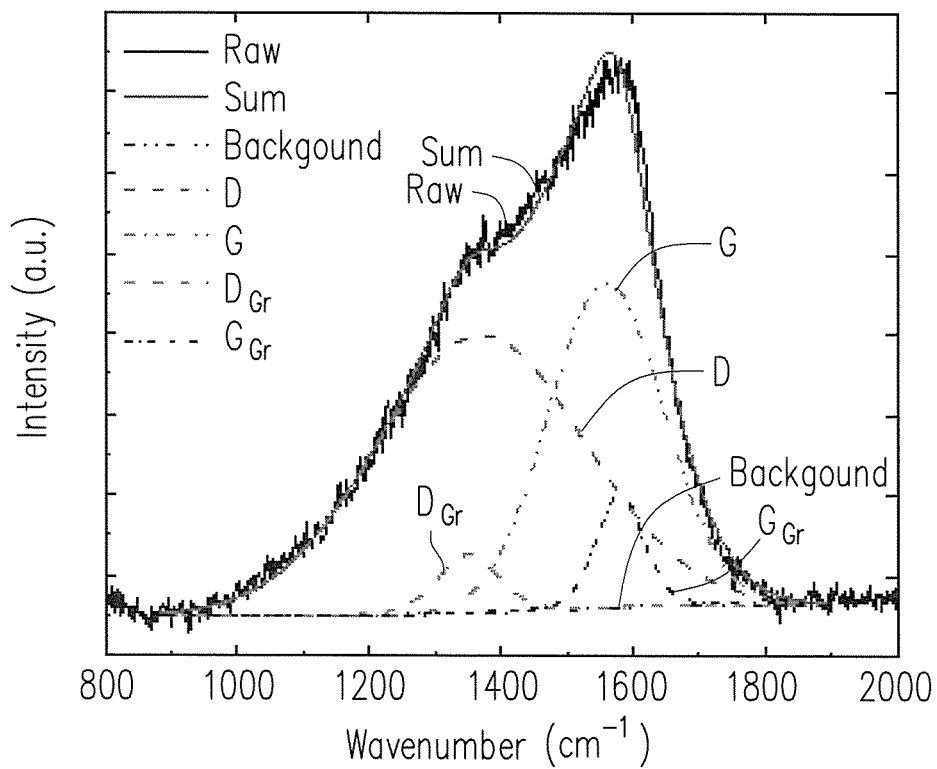
FIG. 6B is a Raman spectrum of Example 1.

FIG. 6A shows that, whether or not there was stress provided by the stress module, the degree of graphitization increased as the annealing temperature increased. At the same temperature, when stress was provided by the stress module before the annealing process was performed, the degree of graphitization increased by 40% or more. Compared to the case where no stress was provided by the stress module, in the case where stress was provided by the stress module, more amorphous carbons had been graphitized in the stressed region at the annealing temperature of 400° C.

Example 4

Figure 7:
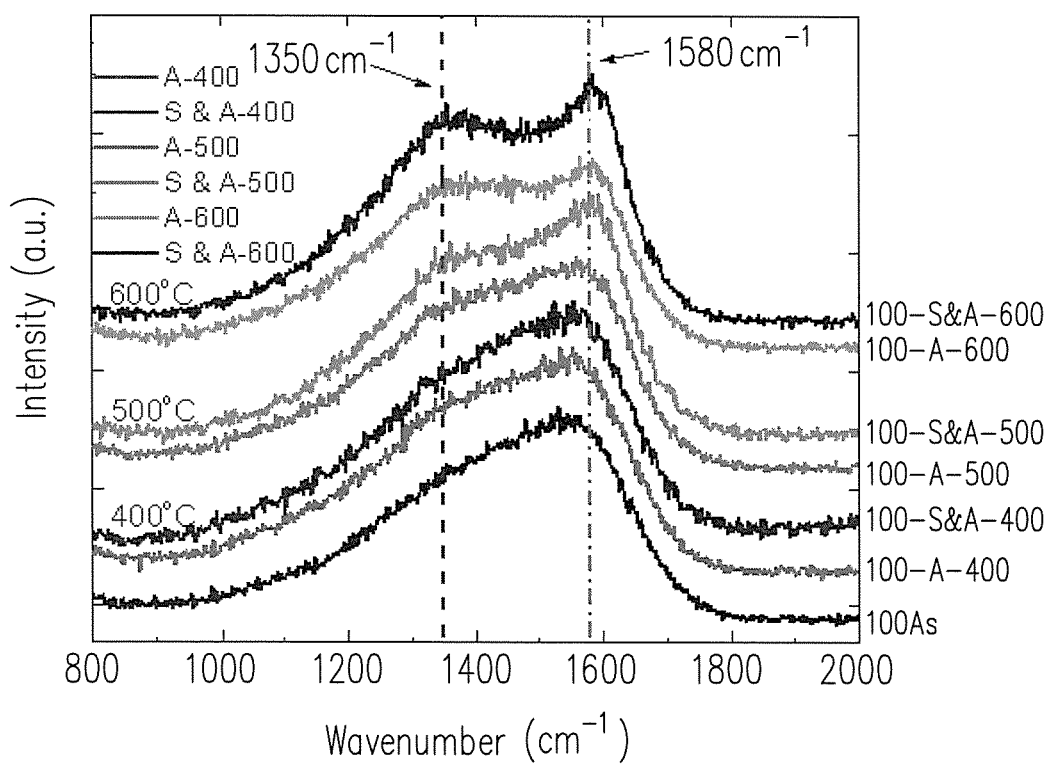
FIG. 7 is Raman spectra of Examples 4 to 6 and Comparative Examples 4 to 7.
Figure 8A:
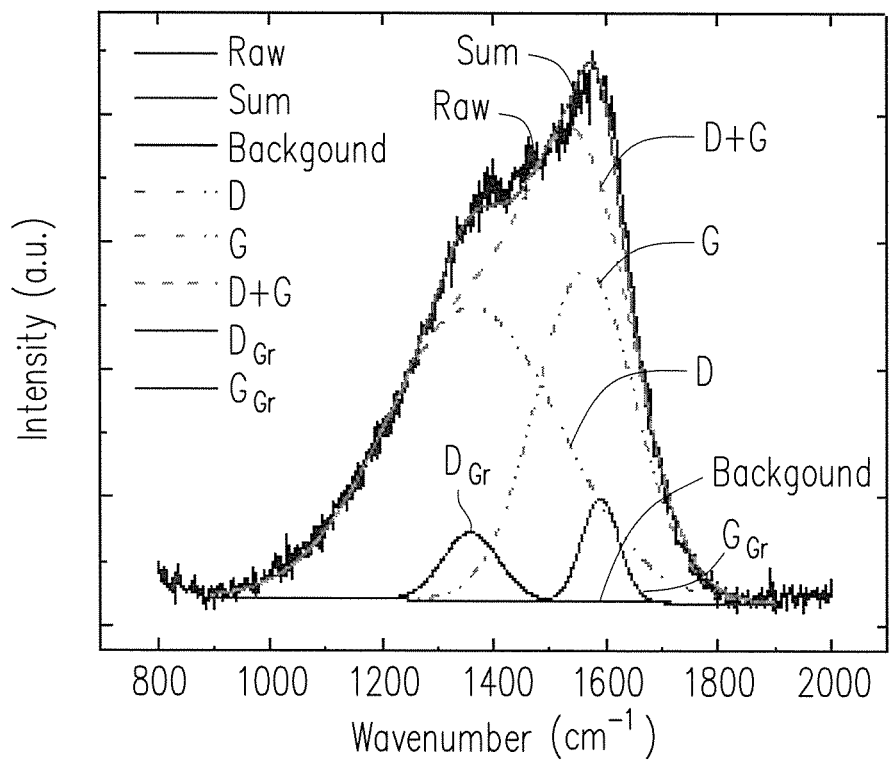
FIG. 8A is a Raman spectrum of Example 5.
Figure 8B:
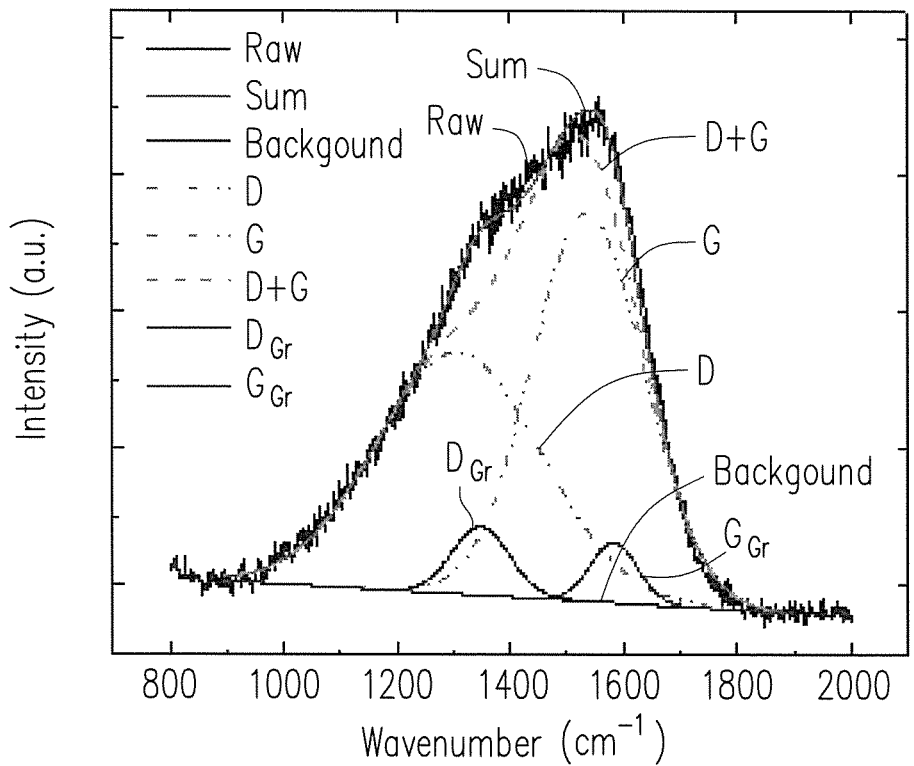
FIG. 8B is a Raman spectrum of Comparative Example 5.
Figure 9A:
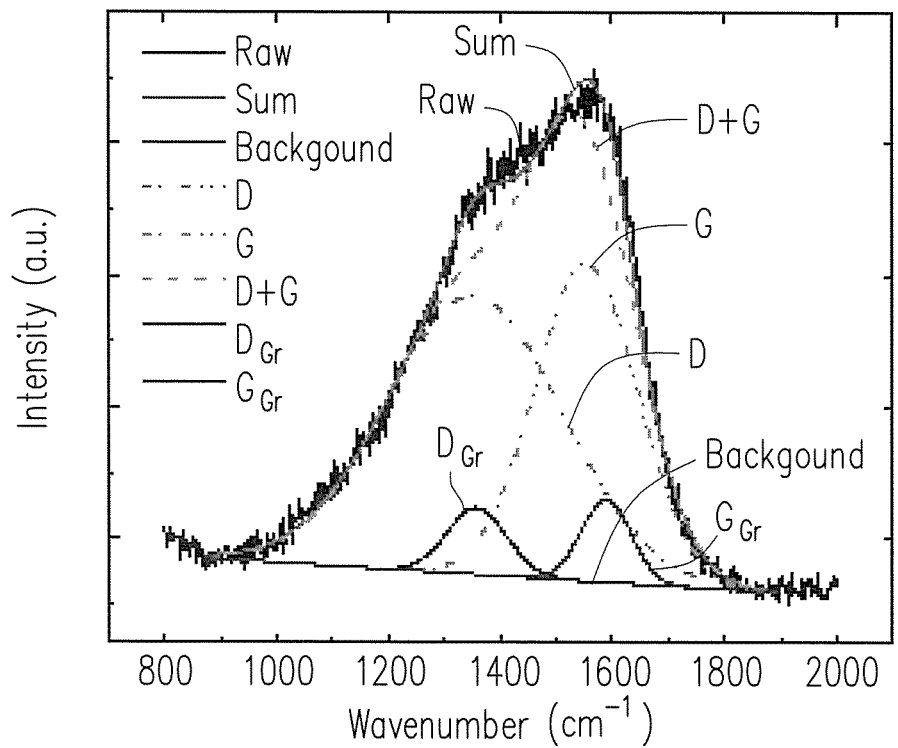
FIG. 9A is a Raman spectrum of Example 6.
Figure 9B:
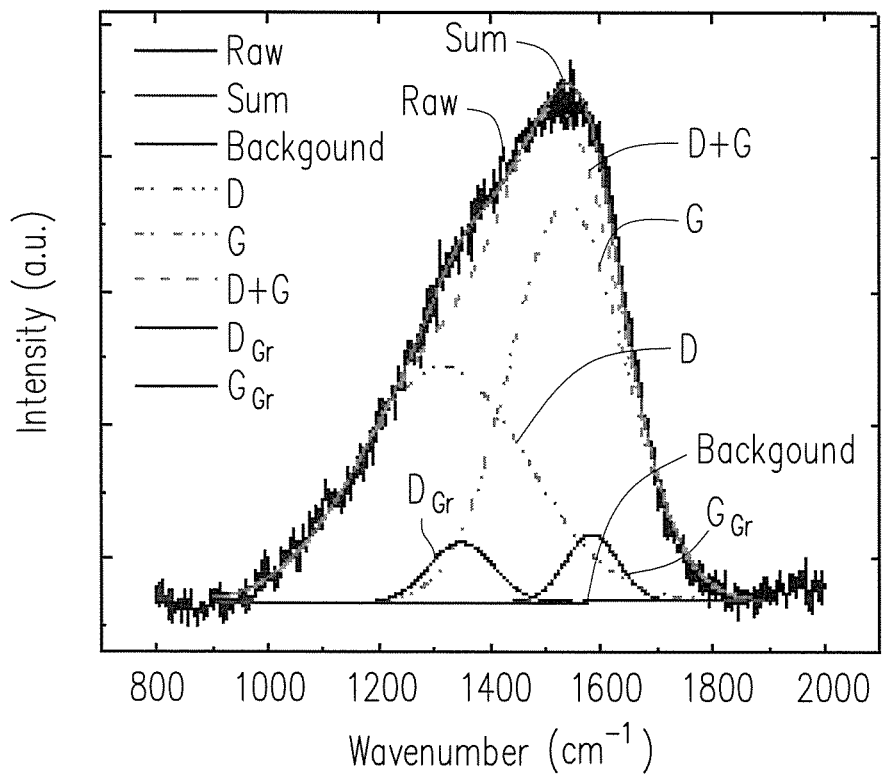
FIG. 9B is a Raman spectrum of Comparative Example 6.
Figure 10:
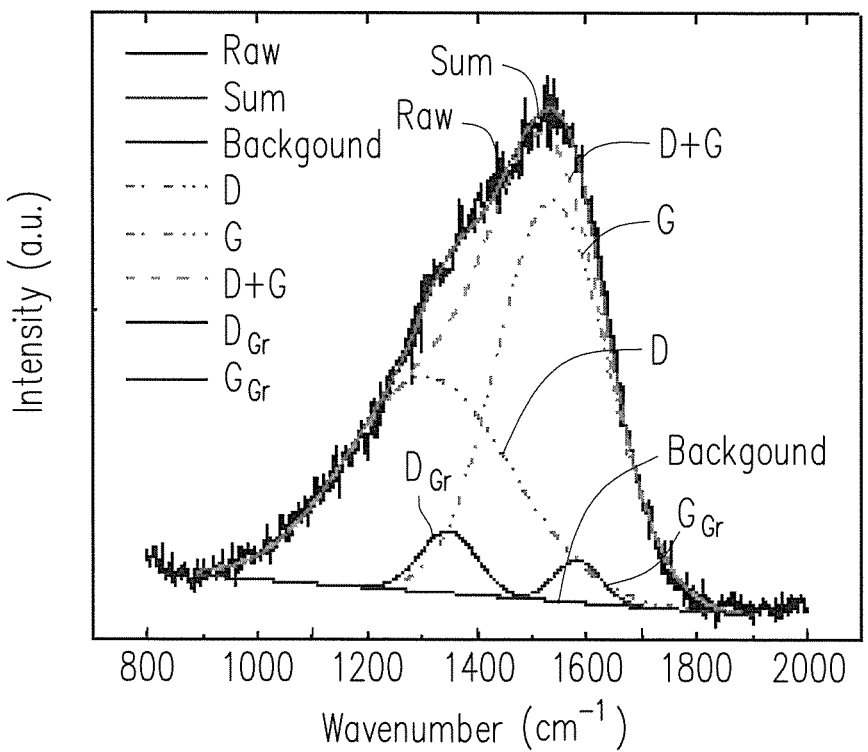
FIG. 10 is a Raman spectrum of Comparative Example 7.
Figure 11:
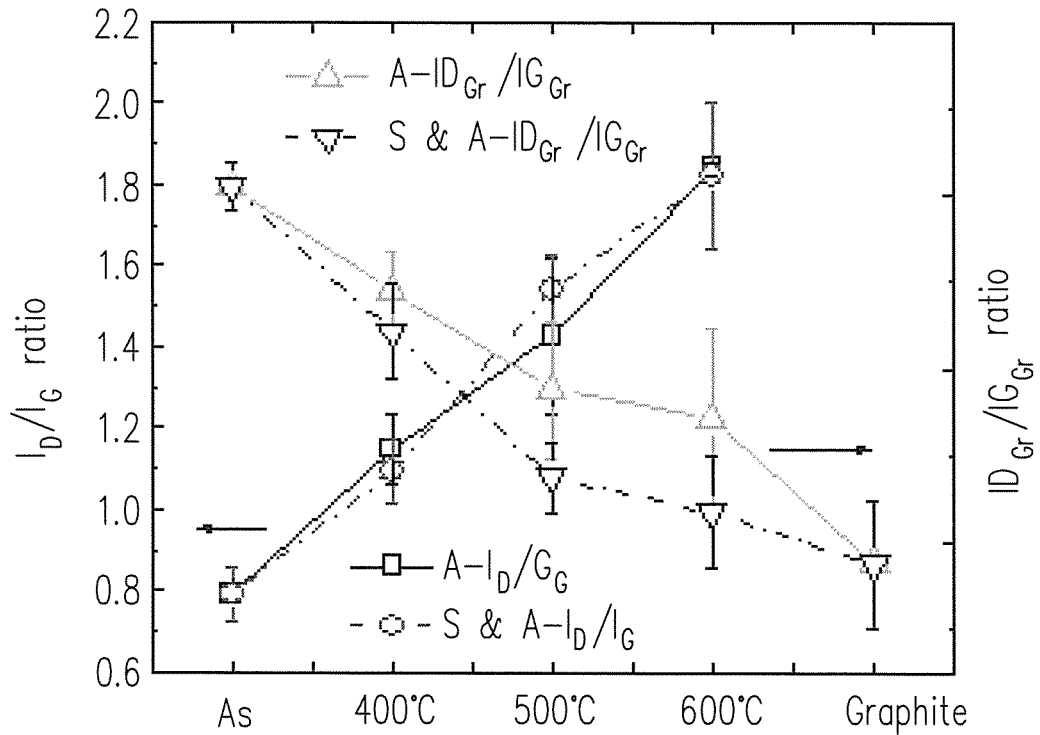
FIG. 11 illustrates relationships between $I_D/I_G$ ratio, $ID_{Gr}/IG_{Gr}$ ratio and annealing temperature in Examples 4 to 6 (with stress application) and Comparative Examples 4 to 7 (without stress application).
Figure 12:
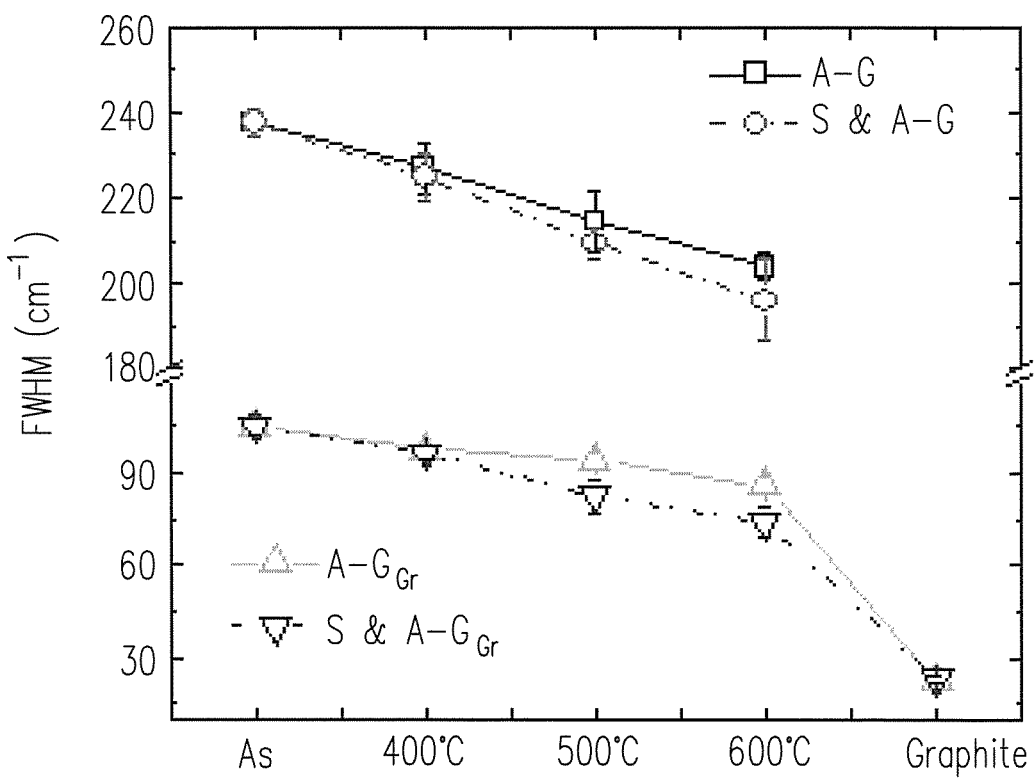
FIG. 12 illustrates relationships between FMHM and annealing temperature in Examples 4 to 6 (with stress application) and Comparative Examples 4 to 7 (without stress application).
Figure 13:
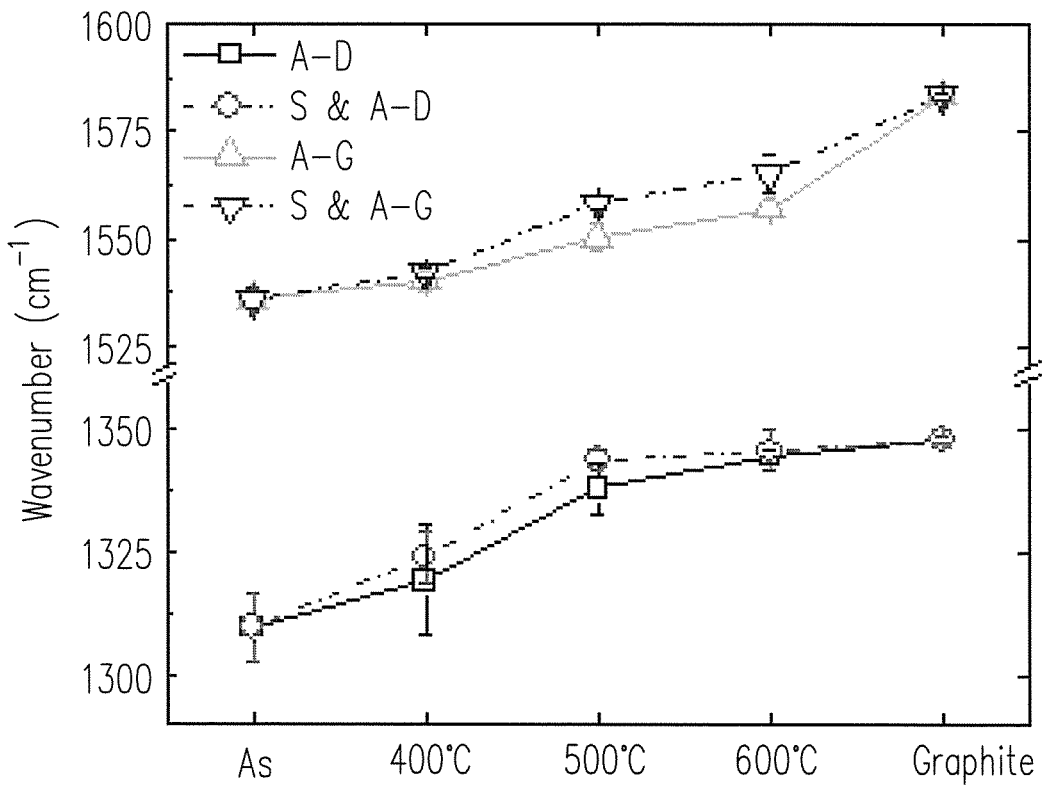
FIG. 13 illustrates relationships between peak positions of D band and G band in the Raman spectra and annealing temperature in Examples 4 to 6 (with stress application) and Comparative Examples 4 to 7 (without stress application).
Figure 14:
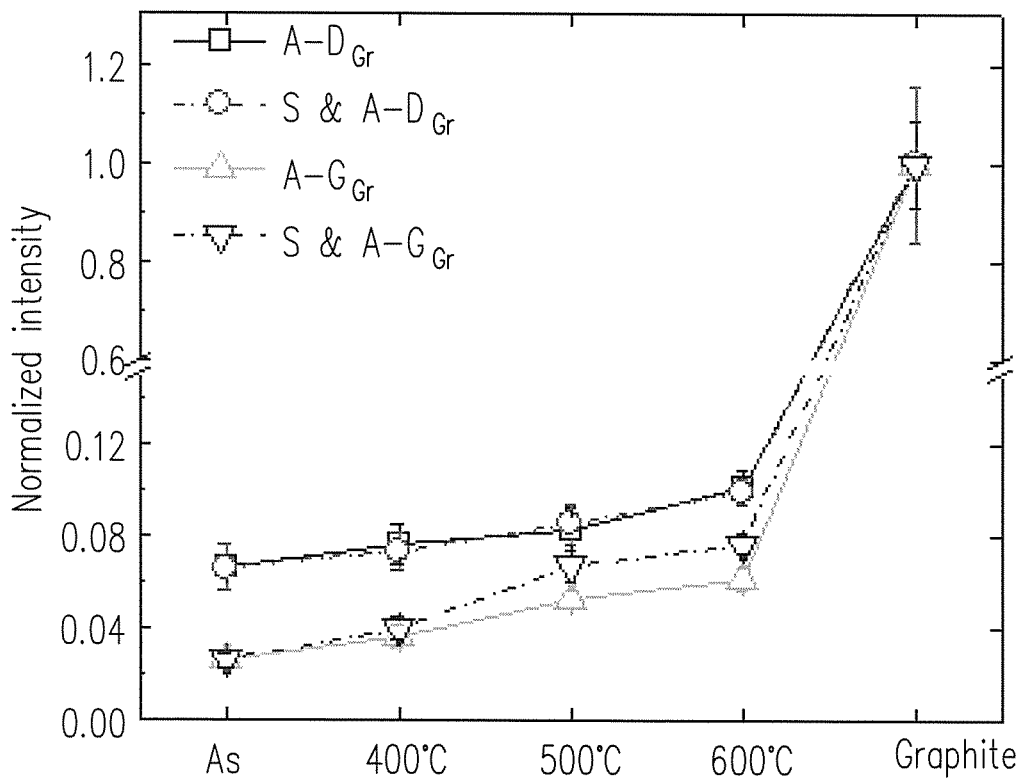
FIG. 14 illustrates relationships between normalized intensity of two peaks in the Raman spectra and annealing temperature in Examples 4 to 6 (with stress application) and Comparative Examples 4 to 7 (without stress application).

In Example 4, steps similar to those in Example 1 were repeated except that the moving speed of the stress module was changed to 10 μm/s. Upon completion, the Raman spectrum was measured and the result was as shown by curve 100-S&A600 in FIG. 7 and as shown in FIGS. 8 to 14.

Example 5

In Example 5, steps similar to those in Example 4 were repeated except that the temperature of the annealing process was changed to 500° C. Upon completion, the Raman spectrum was measured and the result was as shown by curve 100-S&A500 in FIG. 7 and as shown in FIG. 9A and FIGS. 11 to 14.

Example 6

In Example 6, steps similar to those in Example 4 were repeated except that the temperature of the annealing process was changed to 400° C. Upon completion, the Raman spectrum was measured and the result was as shown by curve 100-S&A400 in FIG. 7.

Comparative Examples 4 to 6

In Comparative Example 4, Comparative Example 5 and Comparative Example 6, steps similar to those in Example 4, Example 5 and Example 6 respectively were repeated except that an area to which no stress was provided by the stress module was measured. The result of Comparative Example 4 was as shown by curve 100-A600 in FIG. 7 and as shown in FIG. 8B and FIGS. 11 to 14. The result of Comparative Example 5 was as shown by curve 100-A500 in FIG. 7 and as shown in FIG. 9B and FIGS. 11 to 14. The result of Comparative Example 6 was as shown by curve 100-A400 in FIG. 7.

Comparative Example 7

In Comparative Example 7, steps similar to those in Example 1 were repeated to form an amorphous carbon layer. However, no stress was provided by a stress module and no annealing process was performed. The amorphous carbon layer is herein called an as-deposited layer As. Upon completion, the Raman spectrum was measured and the result was as shown by curve As in FIG. 6A and FIG. 7 and as shown in FIG. 10 and FIGS. 11 to 14.

TABLE 1

|  | Load of stress module (mN) | Moving speed of stress module (μm/s) | Annealing temperature (° C.) |
|---|---|---|---|
| Example 1 | 320 | 50 | 600 |
| Example 2 | 320 | 50 | 500 |
| Example 3 | 320 | 50 | 400 |
| Comparative Example 1 | — | — | 600 |
| Comparative Example 2 | — | — | 500 |
| Comparative Example 3 | — | — | 400 |
| Example 4 | 320 | 10 | 600 |
| Example 5 | 320 | 10 | 500 |
| Example 6 | 320 | 10 | 400 |
| Comparative Example 4 | — | — | 600 |
| Comparative Example 5 | — | — | 500 |
| Comparative Example 6 | — | — | 400 |
| Comparative Example 7 | — | — | — |

The symbols in FIGS. 6A to 14 are defined as follows:

"A" indicates that no stress was applied before the annealing process.

"S&A" indicates that stress was applied before the annealing process.

"Raw" indicates a curve of raw values.

"Sum" indicates a curve of a sum of all peak values.

"Background" indicates background values.

"D" indicates a D band having a peak at around 1350 cm$^{-1}$.

"G" indicates a G band having a peak at around 1580 cm$^{-1}$.

"$D_{Gr}$" indicates the D peak of a graphite signal.

"$G_{Gr}$" indicates the G peak of a graphite signal.

"$I_D$" indicates intensity of the D band.

"$I_G$" indicates intensity of the G band.

"$ID_{Gr}$" indicates intensity of the D peak of a graphite signal.

"$IG_{Gr}$" indicates intensity of the G peak of a graphite signal.

"A-$ID_{Gr}/IG_{Gr}$" indicates an intensity ratio between $D_{Gr}$ and $G_{Gr}$ in the case where no stress was applied before the annealing process.

"S&A$ID_{Gr}/IG_{Gr}$" indicates the intensity ratio between $D_{Gr}$ and $G_{Gr}$ in the case where stress was applied before the annealing process.

"A-G" indicates the G band in the case where no stress was applied before the annealing process.

"S&A-G" indicates the G band in the case where stress was applied before the annealing process.

"A-$I_D/I_G$" indicates an intensity ratio between the D band and the G band in the case where no stress was applied before the annealing process.

"S&A-$I_D/I_G$" indicates the intensity ratio between the D band and the G band in the case where stress was applied before the annealing process.

"A-$G_{Gr}$" indicates the G peak of a graphite signal in the case where no stress was applied before the annealing process.

"S&A-$G_{Gr}$" indicates the G peak of a graphite signal in the case where stress was applied before the annealing process.

"A-D" indicates the D band in the case where no stress was applied before the annealing process.

"S&A-D" indicates the D band in the case where stress was applied before the annealing process.

"A-$D_{Gr}$" indicates the D peak of a graphite signal in the case where no stress was applied before the annealing process.

"S&A-$D_{Gr}$" indicates the D peak of a graphite signal in the case where stress was applied before the annealing process.

"As" indicates that no stress was applied and no annealing process was performed.

"S&A-80 μm" indicates where the stress generated by the stress module was smallest, and the applied stress was about 3.23 GPa.

"S&A-40 μm" indicates where the stress generated by the stress module was larger than that of S&A-80 μm but smaller than that of S&A-20 μm, and the applied stress was about 4.27 GPa.

"S&A-20 μm" indicates where the stress generated by the stress module was larger than that of S&A-40 μm but smaller than that of S&A-10 μm, and the applied stress was about 5.33 GPa.

"S&A-10 μm" indicates where the stress generated by the stress module was largest, and the applied stress was about 6.07 GPa.

Similarly, the results show that the degree of graphitization increased as the annealing temperature increased. At the same temperature, when stress was provided by the stress module before the annealing process was performed, the degree of graphitization was improved. The FWHM and positions and intensities of the D peak and the G peak show that more amorphous carbons were graphitized in the stressed region. In addition, there was a noticeable change in the intensities and FWHM of $D_{Gr}$ and $G_{Gr}$ in the stressed region.

Example 7

An amorphous carbon layer having a thickness of 1000 nm was deposited on a copper foil substrate by arc ion plating. The short-range ordered structure region accounts for 65% to 75% of the amorphous carbon layer. Upon completion, a force was applied on a surface of the amorphous carbon layer by a patterning SiC template, so as to form a patterned indentation of 5×5 cm². The magnitude of the applied force was around 3 tons, which was converted to stress of around 3 GPa through a mold. After the stress had been applied, a test specimen was placed in an atmosphere annealing furnace, heated at a rate of 200° C./min to an annealing temperature of 600° C., and held at that temperature for 30 minutes. Upon completion, the stressed region (region A) and the unstressed region (region B) were subjected to Raman spectroscopy, transmission electron microscopy (TEM) and electrical inspection so as to confirm whether there was any structural change. Further, a measurement of a half cell of a lithium ion battery is performed so as to determine dual structure characteristics. The electrical inspection was performed as follows using a conductive atomic force microscope (CAFM). A voltage of 0 to 10 V was applied and a numerical value of current was measured. The Raman spectrum of the stressed region (region A) was as shown by curve S&A in FIG. 15, the result of the electrical inspection was as shown by curve S&A in FIG. 16, and the TEM image was as shown in FIG. 17A. The Raman spectrum of the unstressed region (region B) was as shown by curve A in FIG. 15, the result of the electrical inspection was as shown by curve A in FIG. 16, and the TEM image was as shown in FIG. 17B.

Comparative Example 8

Steps similar to Example 7 were repeated except that no stress was applied after the amorphous carbon layer was formed and that no annealing was performed. Upon completion, the Raman spectrum was measured as shown by curve As in FIG. 15, and the result of the electrical inspection was as shown by curve As in FIG. 16.

Comparative Example 9

Figure 16:
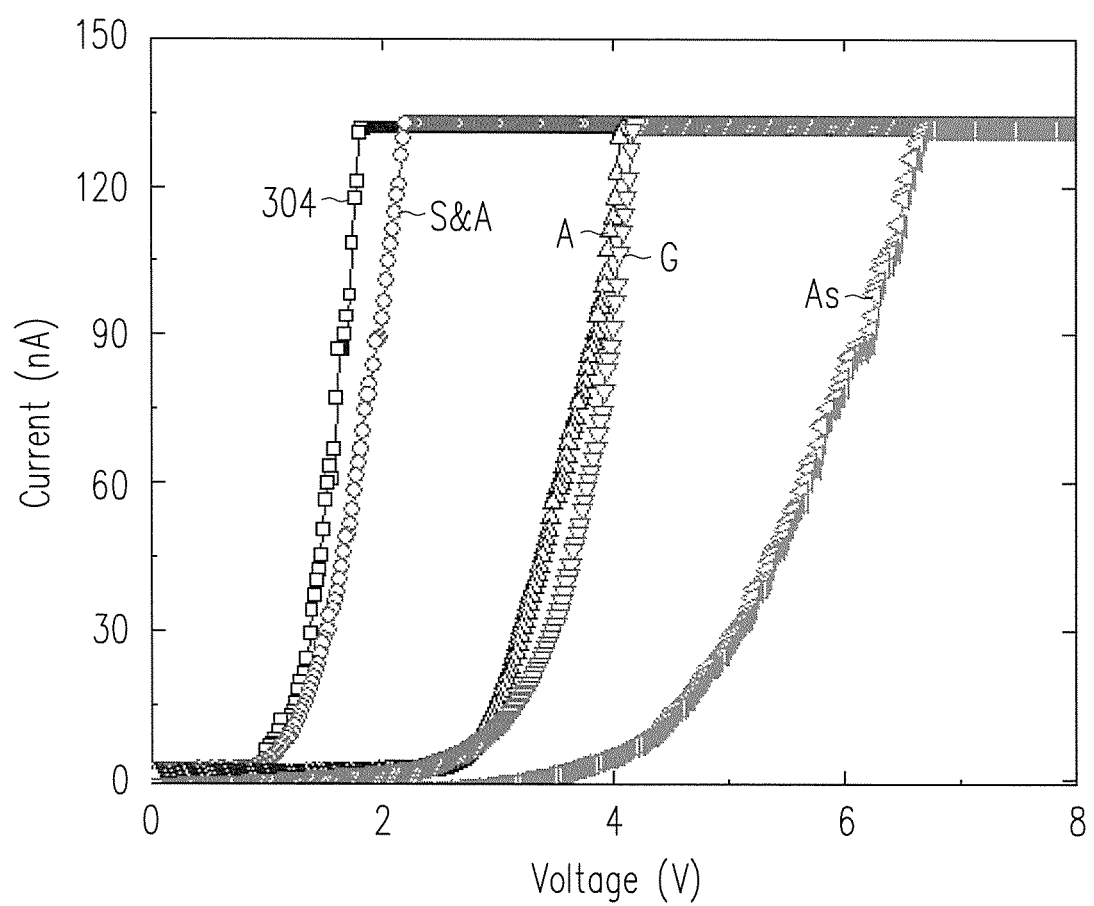
FIG. 16 illustrates an electrical property test on Example 7, Comparative Example 8 (without stress application), Comparative Example 9 and Comparative Example 10.
Figure 17A:
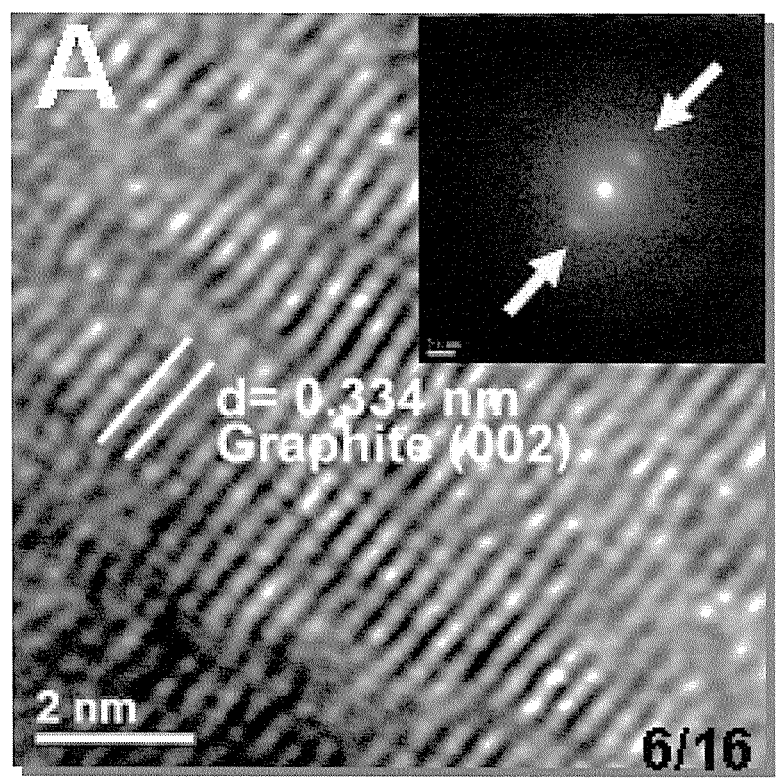
FIG. 17A is a TEM image of a stressed region (region A) in Example 7.
Figure 17B:
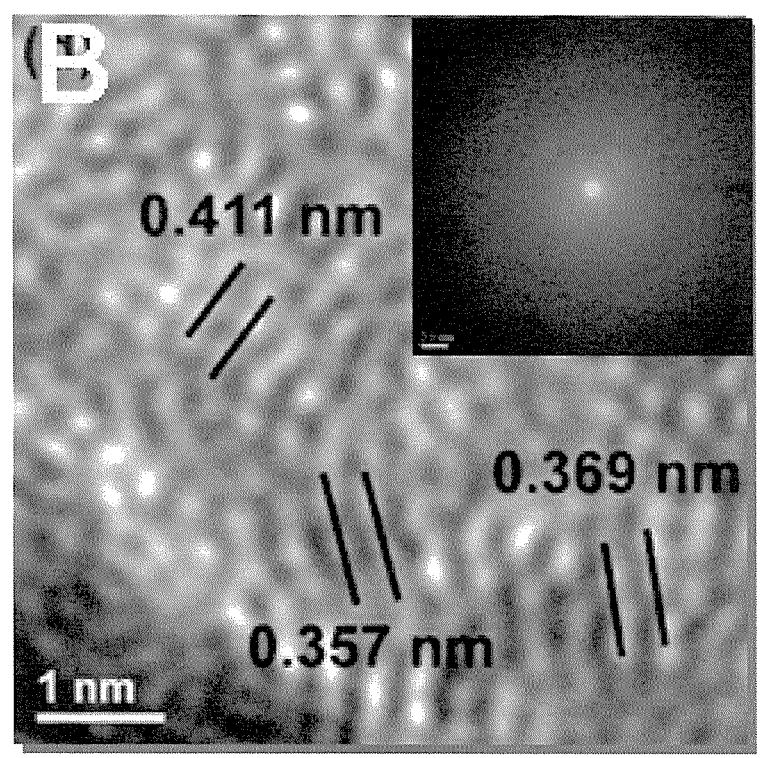
FIG. 17B is a TEM image of an unstressed region (region B) in Example 7.

A commercially available graphite paper made by DuPont and having a thickness of $1 \times 10^{-4}$ m was subjected to electrical inspection, and the result was as shown by curve G in FIG. 16.

Comparative Example 10

A 304 stainless steel substrate having a thickness of $8 \times 10^{-4}$ m was subjected to electrical inspection, and the result was as shown by curve 304 in FIG. 16.

TABLE 2

| | Conditions | Resistivity ($\Omega \cdot cm$) |
|---|---|---|
| Example 7, region A | Annealing was performed after stress was applied, stressed region | $8.19 \times 10^{-5}$ |
| Example 7, region B | Annealing was performed after stress was applied, unstressed region | $2.54 \times 10^{-4}$ |
| Comparative Example 8 | No stress was applied and no annealing was performed | $4.81 \times 10^{-4}$ |
| Comparative Example 9 | Graphite paper | $6.06 \times 10^{-3}$ |
| Comparative Example 10 | 304 stainless steel | $7.51 \times 10^{-5}$ |

Figure 15:
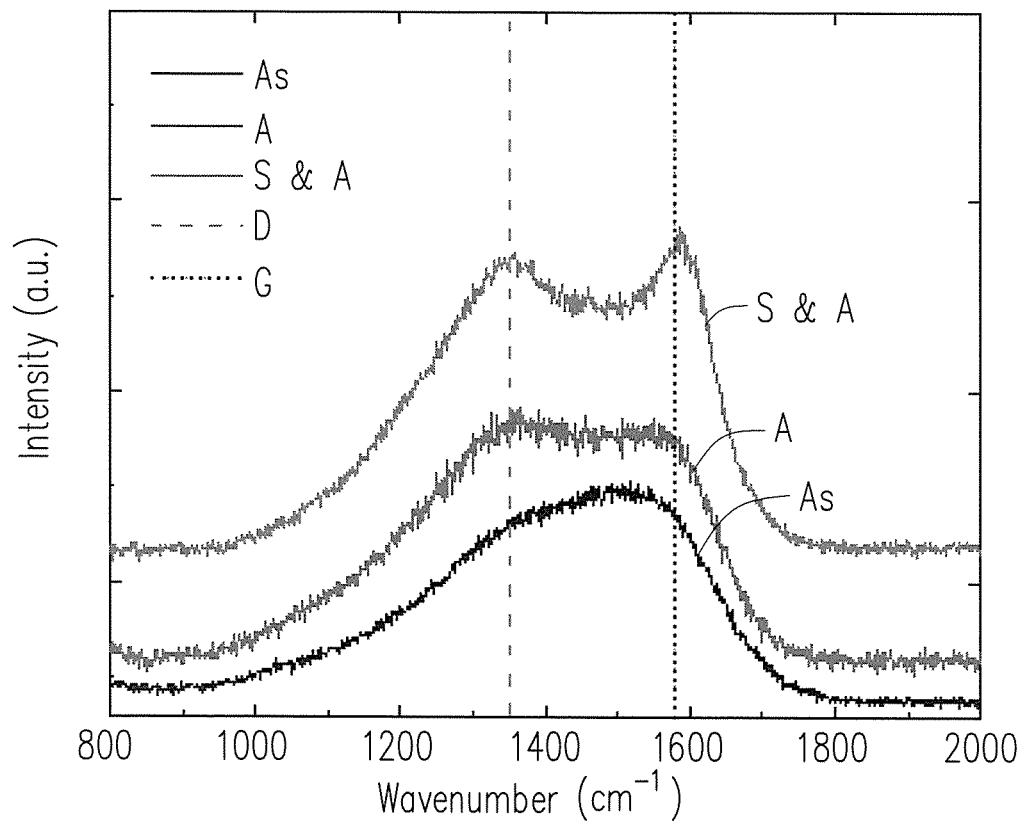
FIG. 15 is Raman spectra of Example 7 (with stress application) and Comparative Example 8 (without stress application).

FIG. 15 shows that, at the same thermal annealing temperature, compared to the unstressed region B, the degree of graphitization in the stressed region A increased by 40% or more. FIG. 17A shows that in the stressed region A, a pitch between two adjacent planes of the textured graphite structure perpendicular to the substrate was around 0.334 mm. FIG. 17A shows that the unstressed region B contained graphite with more defects, and had random orientation. Moreover, according to FIG. 16 and Table 2, the resistivity of the stressed region A was noticeably less than that of the unstressed region B, and the resistivity of the stressed region A was as low as that of a stainless steel substrate. This proves that the graphite formed in the stressed region A had a textured structure and thus had considerably improved conductivity. In addition, the horizontally oriented graphite paper further proves that conductivity of graphite is worse on a cross plane.

Examples 8 to 11

In each of Examples 8 to 11, an amorphous carbon layer having a thickness of 1000 nm was deposited on a copper foil substrate by arc ion plating. The short-range ordered structure region accounts for 65% to 75% of the amorphous carbon layer. Then, a continuously increasing stress was applied on a surface of the amorphous carbon layer by a stress module, so as to scrape a line having a length of 2000 µm. The stress (scratch stress) applied by the stress module had a magnitude of around 3 GPa to 10 GPa. The stress module had a load of 0 to 400 mN and moved at a speed of 10 µm/s. According to the magnitude of the applied stress, the curves were respectively named, from the largest stress to the smallest stress, S&A-10 µm, S&A-20 µm, S&A-40 µm and S&A-80 µm, and the applied stress were 6.07 GPa, 5.33 GPa, 4.27 GPa and 3.23 GPa, respectively. After the stress was applied, a test specimen was placed in an atmosphere annealing furnace, heated at a rate of 200° C./min, annealed at 600° C. and held at that temperature for 30 minutes. Upon completion, the Raman spectra of an area where stress was applied were measured as shown by curves S&A-10 µm, S&A-20 µm, S&A-40 µm and S&A-80 µm in FIG. 18A, and the FWHM and normalized intensity of the G band were as shown in FIG. 18B.

Comparative Example 11

Figure 18A:
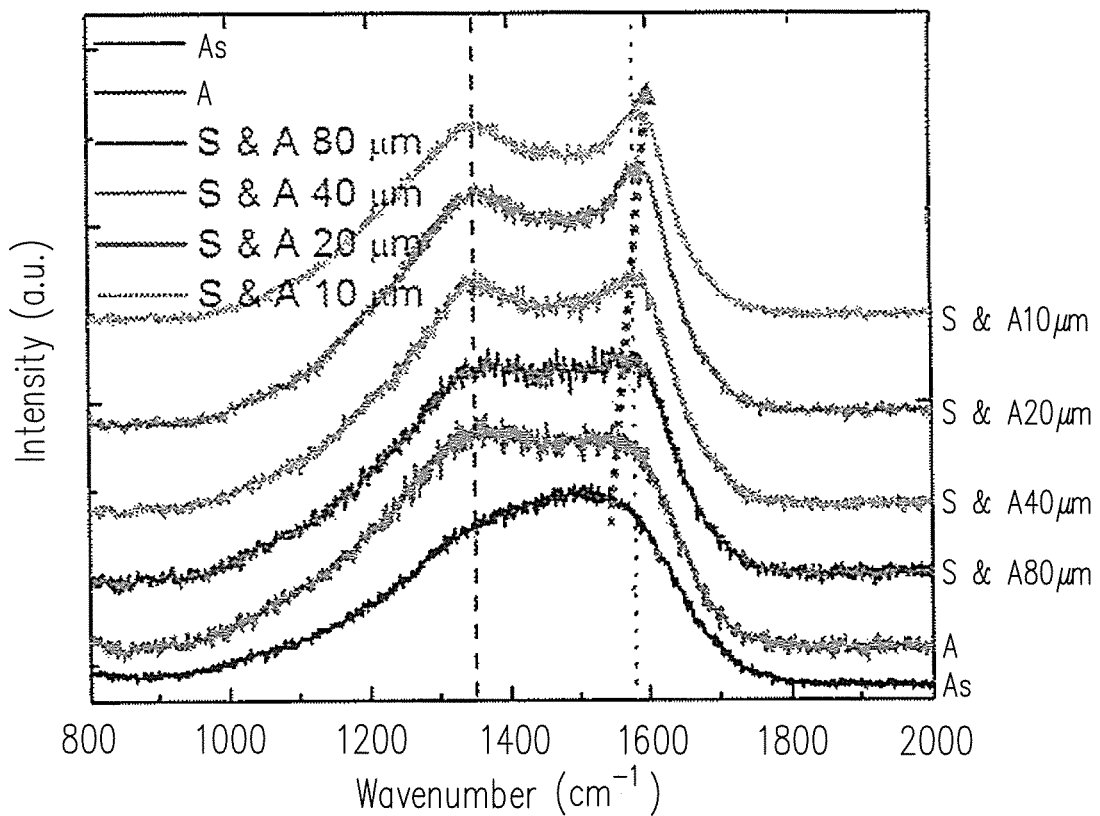
FIG. 18A is Raman spectra of Examples 8 to 11 and Comparative Examples 11 to 12.
Figure 18B:
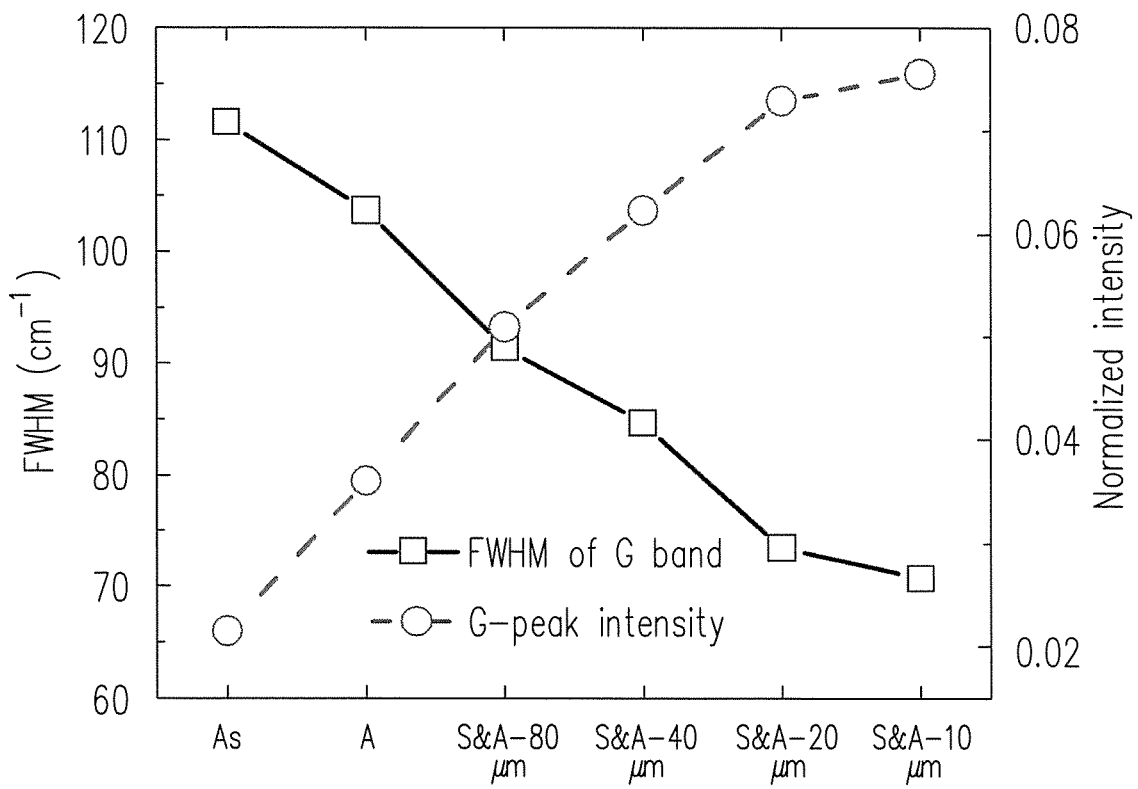
FIG. 18B illustrates a full width at half maximum (FWHM) of Examples 8 to 11 and Comparative Examples 11 to 12.

Steps similar to Example 8 were repeated except that an area of the amorphous carbon layer where no stress was applied was measured, and the Raman spectrum was as shown by curve A in FIG. 18A, and the FWHM and normalized intensity of the G band were as shown in FIG. 18B.

Comparative Example 12

Steps similar to Example 8 were repeated except that no stress was applied after the amorphous carbon layer was formed and that no annealing was performed. The short-range ordered structure region accounts for 65% to 75% of the amorphous carbon layer. Upon completion, the Raman spectrum was measured as shown by curve As in FIG. 18A, and the FWHM and normalized intensity of the G band were as shown in FIG. 18B.

FIG. 18A shows that, at the same annealing temperature, compared to the unstressed region (As), the degree of graphitization in the stressed region (S&A-10 µm) in which stress was applied before annealing increased by 40%. In addition, the gradual increase in intensity of S&A-80 µm, S&A-40 µm, S&A-20 µm and S&A-10 µm means that the degree of graphitization improved as the applied stress increased. FIG. 18B shows that in S&A-80 µm, S&A-40 µm, S&A-20 µm and S&A-10 µm, the FWHM of the G band gradually decreased while the intensity of the G peak gradually increased, which means that, as the applied stress increased, the FWHM of the G band noticeably decreased and the intensity of the G peak noticeably increased. Moreover, the TEM measurement results show that the pitch P of two adjacent (002) planes of the graphite formed in the stressed region was 0.341 nm and the planes were perpendicular to the substrate.

Figure 19:
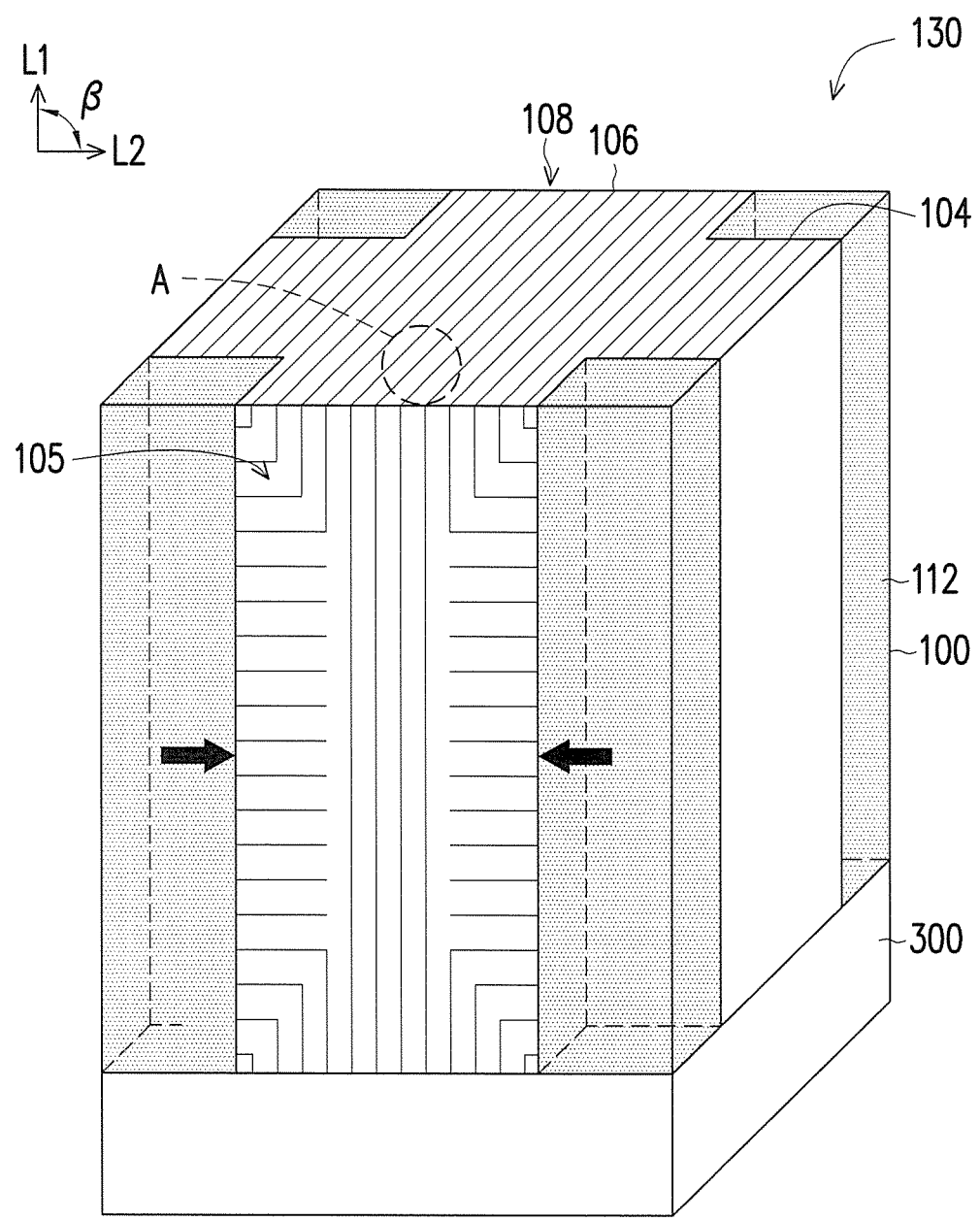
FIG. 19 is a schematic diagram of a composite electrode according to some embodiments of the disclosure.

Referring to FIG. 19, the composite structure containing textured graphite according to the embodiments of the disclosure may be applied as a composite electrode structure including an electrode current collector 300 and the graphite composite structure 130. The electrode current collector 300 includes a metal or an alloy, such as copper or stainless steel. The graphite composite structure 130 is located on the electrode current collector 300, including the long-range ordered graphite structure 104 and the amorphous carbon layer 100/the amorphous carbon region 112 which have been explained in detail as above and will not be repeated herein.

Example 12

Figure 20:
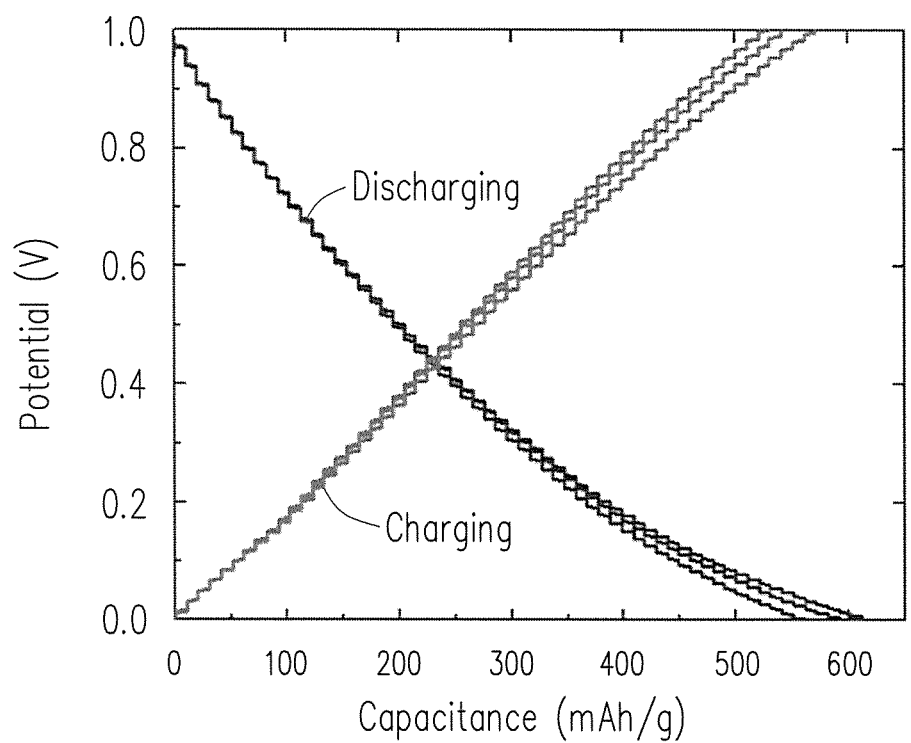
FIG. 20 illustrates results of charging and discharging in a capacitance test using an electrode of Example 12 of the disclosure by using a standard reference electrode.

An amorphous carbon layer having a thickness of 1000 nm was plated on an electrode copper foil current collector by PVD. Then, stress (3 tons in weight and around 3 GPa in magnitude) was applied onto the material by a stress template. Next, annealing was performed in an RTA atmosphere under conditions of a temperature ramp rate of 200° C./min, a temperature of 500° C. and a temperature holding time of 30 minutes. Then, a capacitance test was conducted using a standard reference electrode, and results of charging and discharging were as shown in FIG. 20.

Example 12 shows that an electrode material having a composite structure was obtained on the electrode copper foil current collector. More specifically, a long-range ordered graphite structure was obtained in a region (stressed region) of the amorphous carbon layer in which the stress was applied, and amorphous carbon was obtained in a region (unstressed region) of the amorphous carbon layer in which no stress was applied. The capacitance obtained in Example 12 was around 510 mAh/g, considerably greater than a maximum capacitance (around 300 mAh/g) that can be obtained by common methods using a crystalline graphite material as an electrode. In addition, in Example 12, after repeating the cycle of charging and discharging 30 times, the capacitance did not change considerably. On the other hand, after repeating 30 times the cycle of charging and discharging using an amorphous carbon layer as an electrode, the capacitance decreased considerably. It can be inferred that in the graphite composite structure of the electrode in Example 12, the long-range ordered graphite structure provided a rapid conduction and transmission channel while the amorphous carbon provided a good capacitance storage effect.

In summary, the embodiments of the disclosure introduce a graphite composite structure that can be patterned and proportions therein are adjustable and controllable, and also introduce a stress-induced graphitization preparation method. By combining stress-induced graphitization with patterning, a long-range ordered graphite structure can be grown over a large area and proportions therein can be adjusted and controlled, so as to achieve an interconnection having high conductivity or other application. In the composite structure having a long-range ordered graphite structure, the long-range ordered graphite structure has good directional transmission capability, large current capacity and high conductivity. The composite structure having the long-range ordered graphite structure according to the embodiments of the disclosure may be applied to interconnection of high directivity conductive electronic devices, electrode materials having dual structure characteristics, and electrode materials of high power lithium-ion batteries.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of fabricating a graphite composite structure, comprising:
   providing an amorphous carbon layer, wherein a short-range ordered structure region accounts for 50% to 100% of the amorphous carbon layer;
   locally applying at least one force on a surface of the amorphous carbon layer to form at least one stressed region; and
   performing an annealing process on the amorphous carbon layer so as to form:
   at least one long-range ordered graphite structure in the at least one stressed region, wherein the at least one long-range ordered graphite structure comprises a stack structure comprising a plurality of (002) planes as first planes, and an angle between the (002) planes and the surface of the amorphous carbon layer is in a range from 45 degrees or more to 90 degrees or less, and
   a transition region between the at least one long-range ordered graphite structure and the amorphous carbon layer, including graphite comprising a plurality of second planes, wherein the second planes are not parallel with the (002) planes.

2. The method of fabricating a graphite composite structure according to claim 1, wherein a magnitude of the at least one force is in a range from 3 to 10 GPa.

3. The method of fabricating a graphite composite structure according to claim 1, wherein the step of locally applying the at least one force on the surface of the amorphous carbon layer comprises applying a plurality of forces to different regions of the surface of the amorphous carbon layer so as to form a plurality of stressed regions, wherein the forces are the same as each other in at least one of magnitude, acting direction and pattern.

4. The method of fabricating a graphite composite structure according to claim 1, wherein the step of locally applying the at least one force on the surface of the amorphous carbon layer comprises applying a plurality of forces to different regions of the surface of the amorphous carbon layer so as to form a plurality of stressed regions, wherein the forces are different from each other in at least one of magnitude, acting direction and pattern.

5. The method of fabricating a graphite composite structure according to claim 1, wherein the step of locally applying the at least one force on the surface of the amorphous carbon layer comprises simultaneously applying a plurality of forces to different regions of the amorphous carbon layer.

6. The method of fabricating a graphite composite structure according to claim 1, wherein the step of locally applying the at least one force on the surface of the amorphous carbon layer comprises sequentially applying a plurality of forces to different regions of the amorphous carbon layer.

7. The method of fabricating a graphite composite structure according to claim 1, wherein the step of locally applying the at least one force on the surface of the amorphous carbon layer comprises:
   disposing a template on the amorphous carbon layer and applying the at least one force on the template; or
   using a continuous stress generation roller.

8. The method of fabricating a graphite composite structure according to claim 1, wherein the annealing process is performed at a temperature of 400 to 900° C.

9. The method of fabricating a graphite composite structure according to claim 1, wherein the annealing process is performed for 5 minutes to 120 minutes.

10. The method of fabricating a graphite composite structure according to claim 1, wherein the step of locally applying the at least one force and the step of performing the annealing process are sequentially performed.

11. The method of fabricating a graphite composite structure according to claim 1, wherein the step of locally applying the at least one force and the step of performing the annealing process are simultaneously performed.

12. A graphite composite structure, comprising:
an amorphous carbon layer;
at least one long-range ordered graphite structure located in the amorphous carbon layer, wherein the at least one long-range ordered graphite structure comprises a stack structure comprising a plurality of first planes, an angle between the first planes and a surface of the amorphous carbon layer is in a range from 45 degrees or more to 90 degrees or less, and resistivity of the at least one long-range ordered graphite structure is in a range from $1\times10^{-5}$ to $1\times10^{-4}$ Ω·cm; and
a transition region between the at least one long-range ordered graphite structure and the amorphous carbon layer, including graphite comprising a plurality of second planes, wherein the second planes are not parallel with the first planes.

13. The graphite composite structure according to claim 12, wherein the first planes is perpendicular to the surface of the amorphous carbon layer.

14. The graphite composite structure according to claim 12, wherein the first planes are (002) planes.

15. The graphite composite structure according to claim 12, wherein a spacing of the first planes ranges from 0.30 to 0.39 nm.

16. The graphite composite structure according to claim 12, wherein the at least one long-range ordered graphite structure is a plurality of long-range ordered graphite structures not connected with each other.

17. The graphite composite structure according to claim 12, wherein the angles between the first planes of the at least one long-range ordered graphite structure and the surface of the amorphous carbon layer are the same.

18. The graphite composite structure according to claim 12, wherein the angles between the first planes of the at least one long-range ordered graphite structure and the surface of the amorphous carbon layer differ.

19. The graphite composite structure according to claim 12, wherein the at least one long-range ordered graphite structure is the same in at least one of pattern and volume, or the at least one long-range ordered graphite structure differs in at least one of pattern and volume.

20. A composite electrode structure, comprising:
an electrode current collector; and
a graphite composite structure located on the electrode current collector, comprising:
an amorphous carbon layer located on the electrode current collector;
at least one long-range ordered graphite structure located in the amorphous carbon layer, wherein the at least one long-range ordered graphite structure comprises a stack structure comprising a plurality of first planes, an angle between the first planes and a surface of the amorphous carbon layer is in a range from 45 degrees or more to 90 degrees or less, and resistivity of the at least one long-range ordered graphite structure is in a range from $1\times10^{-5}$ to $1\times10^{-4}$ Ω·cm; and
a transition region between the at least one long-range ordered graphite structure and the amorphous carbon layer, including graphite comprising a plurality of second planes, wherein the second planes are not parallel with the first planes.

* * * * *